US011968201B2

(12) United States Patent
Ahmed et al.

(10) Patent No.: US 11,968,201 B2
(45) Date of Patent: Apr. 23, 2024

(54) PER-DEVICE SINGLE SIGN-ON ACROSS APPLICATIONS

(71) Applicant: Cisco Technology, Inc., San Jose, CA (US)

(72) Inventors: Ahmed Bakry Helmy Ahmed, Enschede (NL); Sape Jurrien Mullender, Amsterdam (NL); Hendrikus G. P. Bosch, Aalsmeer (NL); Alessandro Duminuco, Milan (IT); Jeffrey Michael Napper, Delft (NL)

(73) Assignee: Cisco Technology, Inc., San Jose, CA (US)

( * ) Notice: Subject to any disclaimer, the term of this patent is extended or adjusted under 35 U.S.C. 154(b) by 426 days.

(21) Appl. No.: 17/141,007

(22) Filed: Jan. 4, 2021

(65) Prior Publication Data
US 2022/0217132 A1 Jul. 7, 2022

(51) Int. Cl.
*H04L 9/40* (2022.01)
(52) U.S. Cl.
CPC ...... *H04L 63/0815* (2013.01); *H04L 63/0807* (2013.01); *H04L 63/0884* (2013.01); *H04L 63/164* (2013.01)
(58) Field of Classification Search
None
See application file for complete search history.

(56) References Cited

U.S. PATENT DOCUMENTS

| 8,646,035 B1* | 2/2014 | Thomas | H04L 63/105 726/8 |
|---|---|---|---|
| 10,778,684 B2* | 9/2020 | Gupta | H04L 63/166 |
| 11,063,927 B1* | 7/2021 | Varun Mukesh | H04L 67/146 |
| 2006/0048216 A1* | 3/2006 | Hinton | H04L 63/0815 726/8 |
| 2007/0234417 A1* | 10/2007 | Blakley III | H04L 63/0281 726/12 |
| 2009/0106349 A1* | 4/2009 | Harris | H04L 67/568 709/203 |
| 2011/0277026 A1 | 11/2011 | Agarwal et al. | |
| 2012/0210413 A1* | 8/2012 | Akula | H04L 63/0815 726/8 |
| 2013/0227140 A1* | 8/2013 | Hinton | H04L 67/568 709/225 |

(Continued)

*Primary Examiner* — Arezoo Sherkat
(74) *Attorney, Agent, or Firm* — Lee & Hayes, P.C.

(57) ABSTRACT

Operations include transmitting, on behalf of a first application, a first request to a first service provider, the first request requesting first services from the first service provider, intercepting, at a local agent, a first redirect message from the first service provider to an identity provider, receiving an identity provider cookie from the identity provider based on a validation of credentials during the authentication process, storing a copy of the identity provider cookie, transmitting, on behalf of a second application, a second request to a second service provider, the second request requesting second services from the second service provider, intercepting a second redirect message from the second service provider to the identity provider, adding the identity provider cookie to the second redirect message, and receiving validation to access the second service provider from the identity provider based on the identity provider cookie stored by the local agent.

20 Claims, 9 Drawing Sheets

(56) References Cited

U.S. PATENT DOCUMENTS

| | | | |
|---|---|---|---|
| 2014/0047532 A1* | 2/2014 | Sowatskey | G06F 21/445 726/10 |
| 2014/0075513 A1* | 3/2014 | Trammel | G06F 21/41 726/4 |
| 2014/0082715 A1* | 3/2014 | Grajek | H04W 12/068 726/8 |
| 2014/0123264 A1* | 5/2014 | Shull | H04L 63/08 726/7 |
| 2015/0365399 A1* | 12/2015 | Biswas | H04L 63/0815 726/8 |
| 2015/0381625 A1* | 12/2015 | Sowatskey | G06F 21/335 726/5 |
| 2016/0094539 A1 | 3/2016 | Suresh et al. | |
| 2018/0069702 A1 | 3/2018 | Ayyadevara et al. | |
| 2018/0295134 A1 | 10/2018 | Gupta et al. | |
| 2019/0297161 A1* | 9/2019 | Ayyadevara | H04L 67/56 |
| 2019/0364033 A1* | 11/2019 | Wisgo | G06F 21/41 |
| 2020/0014680 A1* | 1/2020 | Gujarathi | H04W 12/069 |
| 2020/0177578 A1* | 6/2020 | Chatnalli Deshpande Sridhar | H04L 67/56 |
| 2022/0210156 A1* | 6/2022 | Shah | H04L 63/0815 |
| 2022/0247791 A1* | 8/2022 | Duminuco | H04L 67/141 |
| 2022/0385651 A1* | 12/2022 | Elderson | H04L 63/0815 |
| 2023/0014970 A1* | 1/2023 | Gujarathi | G06F 21/41 |

* cited by examiner

PER-DEVICE SINGLE SIGN-ON ACROSS APPLICATIONS

TECHNICAL FIELD

The present disclosure relates generally to network authentication and security. Specifically, the present disclosure relates to true device single sign on methods and associated network infrastructure.

BACKGROUND

Users can access a myriad of different types of applications and services via a client device. The client device may be allowed to execute a plurality of different applications and receive services from a plurality of different service providers. However, in most cases, a user may be required to authenticate the different applications' access to the different services provided by the service provider. Having to enter several potentially-different authentication sets (e.g., usernames, passwords, and other authentication factors) may cost significant time and resources to a user to have to remember, enter, and/or document in order to access the various service providers and obtain the services provided thereby.

Enterprise single-sign-on infrastructures may be utilized to achieve at least two benefits with regard to authorized access to the service providers. First, a user may provide their password only to a trusted enterprise authentication service, and, second, once the user has authenticated for one service, that authentication can serve for another service as well. In other words, users do not have to type their password over and over as they move from one enterprise service to another and different passwords are not required for each service. However, single-sign-on (SSO) servers operate based on a per-user and per-application basis wherein a browser application, for example, may be used to move from one service to another without re-authenticating, but that user's authentication is not valid for a mailer application or for a different browser application, for example. A true single-sign-on experience for all applications executed on a user's device that obtains services from a plurality of service providers would positively affect the user's experience in interfacing with the service providers via the applications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
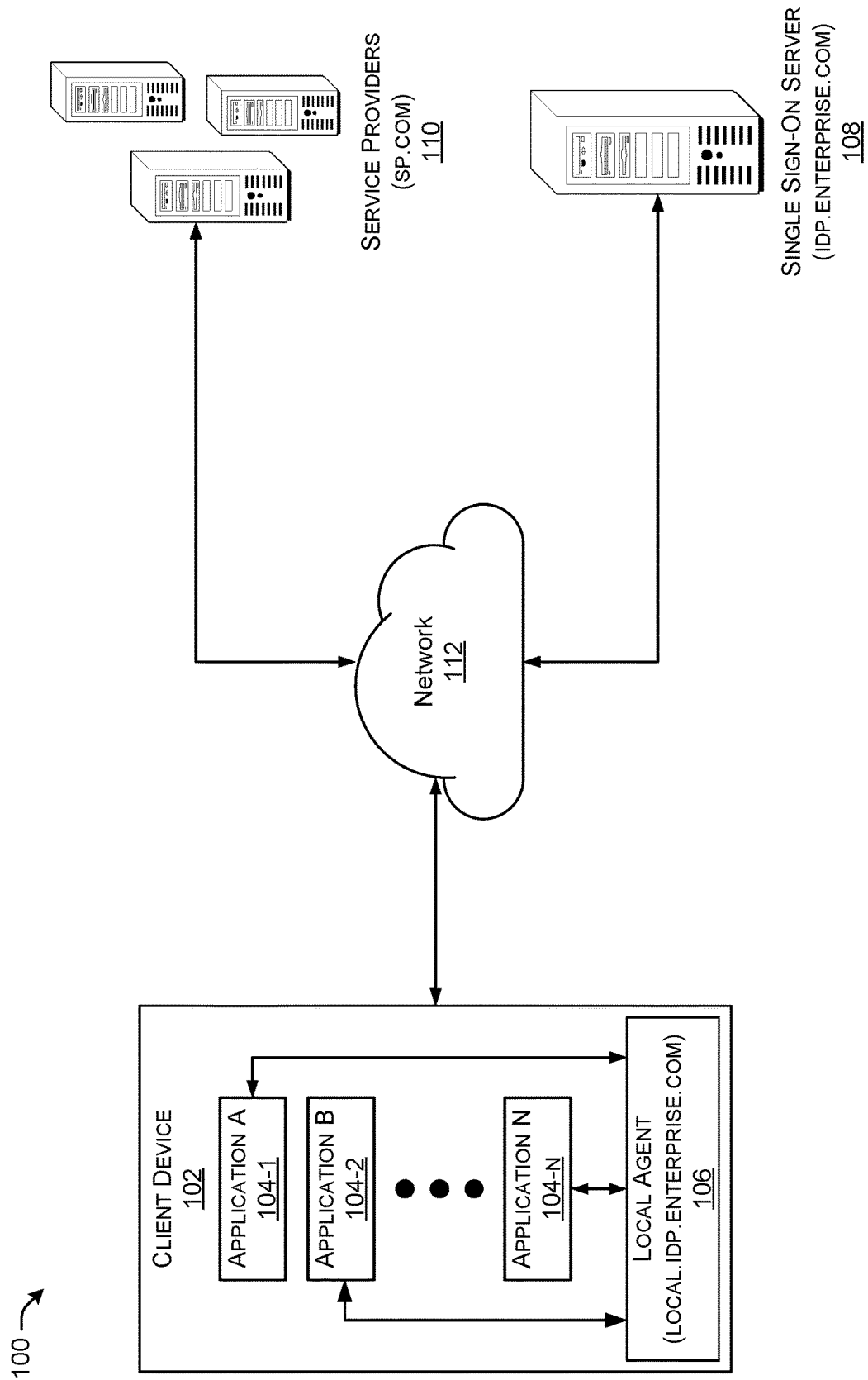
FIG. 1 illustrates a system-architecture diagram of a network that utilizes a local agent, according to an example of the principles described herein.

The true single sign-on systems and methods described herein provide a user device that runs a local agent. The local agent stores a plurality of authentication cookies that serve as authentication material and allows for frictionless sign-on with an identity provider (idp.enterprise.com). The local agent may have an internet protocol (IP) address of local.idp.enterprise.com which is a subdomain of the domain of the identity provider. Because neither local applications, nor service providers should be modified in any way to engage the local agent (e.g., local.idp.enterprise.com) into the sign-on process, an alternative process includes utilization of this local agent into the authentication process. Described herein are at least two methods for providing this true single sign-on experience. The first method described herein relies on local configuration on the user's device and does not require any modification whatsoever to applications, service providers and the identity provider, and the second utilizes collaboration from the identity provider (idp.enterprise.com).

Overview

In the examples described herein, single sign-on systems and methods provide a proxy identity provider (e.g., the local agent (local.idp.enterprise.com) executed on a client device. The local agent acts as a proxy identity provider or proxy single sign-on (SSO) server and stores the authentication cookies that serve as authentication credentials to allow for sign-on with the identity provider (e.g., idp.enterprise.com) which acts as the main, real, or non-proxy identity provider or SSO server. Again, the local agent may be referred to as "local.idp.enterprise.com" since it functions as a sub-domain of the identity provider. Because neither local applications, nor service providers should be modified in any way to engage the local agent (e.g., (local.idp.enterprise.com) into the sign-on process, an alternative process that brings the local agent into the authentication process is described herein.

Examples described herein provide a non-transitory computer-readable medium storing instructions that, when executed, causes a processor to perform operations. The operations include transmitting, on behalf of a first application executed on a client device, a first request to a first service provider via a network, the first request requesting first services from the first service provider, and intercepting, at a local agent, first traffic between a first application and an identity provider, the local agent acting as a proxy identity provider. The operations further include performing an authentication process as to the identity provider, receiving an identity provider cookie from the identity provider based on a validation of credentials during the authentication process, and storing, with the local agent, a copy of the identity provider cookie. The operations further include transmitting, on behalf of a second application executed on the client device, a second request to a second service provider via the network, the second request requesting second services from the second service provider, and intercepting, at the local agent, second traffic between the second application and the identity provider. The operations further include adding the identity provider cookie to the second traffic, and receiving validation to access the second service provider from the identity provider based on the identity provider cookie stored by the local agent.

Transmitting the first request to the first service provider and intercepting, at the local agent, the first redirect message from the first service provider to the identity provider includes receiving the first redirect message from the first service provider via the first application, the first redirect message, as modified by the first application, including a first internet protocol (IP) address of the client device, and determining if the identity provider cookie is stored by the local agent. Further, these processes include, based at least in part on the local agent not storing the identity provider cookie, performing a name resolution, the name resolution returning a second IP address of the identity provider; and transmitting the first redirect message to the identity provider.

The operations further include, based at least in part on the validation of the credentials during the authentication process, receiving a third redirect message from the identity provider, the third redirect message including the identity provider cookie, transmitting the third redirect message to the first application, the first application installing the identity provider cookie, and transmitting the third redirect message to the first service provider. The operations further include, based at least in part on the first service provider validating the identity provider cookie, receiving a service provider cookie from the service provider at the first application, and receiving the first services from the first service provider at the first application based at least in part on the validation of the service provider cookie.

The operations further include receiving the second redirect message from the second service provider via the second application, the second redirect message, as modified by the second application, including the first IP address of the client device, and determining if the identity provider cookie is stored by the local agent. Based at least in part on the local agent storing the identity provider cookie, the operations further include performing a domain name system (DNS) lookup (e.g., a name resolution processes), the DNS lookup returning the second IP address of the identity provider and adding the identity provider cookie stored by the local agent to the first redirect message. The operations further include transmitting the second redirect message to the identity provider.

The operations further include receiving a fourth redirect message from the identity provider, the fourth redirect message validating the identity provider cookie, transmitting the fourth redirect message to the second application, the second application installing the identity provider cookie, and transmitting the fourth redirect message to the second service provider. The operations further include, based at least in part on the second service provider validating the identity provider cookie, receiving a service provider cookie from the service provider at the first application, and receiving the second services from the second service provider at the second application based at least in part on the validation of the service provider cookie.

Defining the routing definition includes, in a routing table, identifying an internet protocol (IP) address of the identity provider, and including a pointer in the routing table, the pointer pointing to an address of the local agent. Transmitting the request to the first service provider and intercepting, at the local agent, the first traffic between the first application and the identity provider may include defining, at the client device, a routing definition including interception of the first traffic and the second traffic to the identity provider by the local agent, receiving a first redirect message from the identity provider via the first service provider and the first application, and determining if the identity provider cookie is stored by the local agent. The operations further include, based at least in part on the local agent not storing the identity provider cookie, with the local agent, transmitting the first redirect message to the identity provider. The operations further include performing, with the local agent, a name resolution process to determine an internet protocol (IP) address of the identify provider, and defining an identity mapping within a routing table to map a name of the identity provider with an address of the local agent. The operations further include, based at least in part on the validation of the credentials during the authentication process, receiving a third redirect message from the identity provider via the first application, the third redirect message including the identity provider cookie, storing, with the local agent, the copy of the identity provider cookie, and transmitting the third redirect message to the first service provider.

The operations further include receiving the second redirect message from the second service provider via the second application and the identity provider and determining if the identity provider cookie is stored by the local agent. The operations further include, based at least in part on the local agent storing the identity provider cookie, transmitting a fourth redirect message to the identity provider for validation via the second application, the fourth redirect message including instructions to install the identity provider cookie on the second application, and transmitting the fourth redirect message to the second service provider. The operations further include determining if the second application is local to the client device. The operations further include, based at least in part on the second service provider validating the identity provider cookie, receiving a service provider cookie from the service provider at the second application, and receiving the second services from the second service provider at the second application based at least in part on the validation of the service provider cookie.

Examples described herein also provide a client device including a processor, and a non-transitory computer-readable media storing instructions that, when executed by the processor, causes the processor to perform operations including transmitting, on behalf of a first application executed on a client device, a first request to a first service provider via a network, the first request requesting first services from the first service provider, intercepting, at a local agent, first traffic between a first application and an identity provider, the local agent acting as a proxy identity provider, performing an authentication process as to the identity provider, receiving an identity provider cookie from the identity provider based on a validation of credentials during the authentication process, storing, with the local agent, a copy of the identity provider cookie, transmitting, on behalf of a second application executed on the client device, a second request to a second service provider via the network, the second request requesting second services from the second service provider, intercepting, at the local agent, second traffic between the second application and the identity provider, adding the identity provider cookie to the second traffic, and receiving validation to access the second service provider from the identity provider based on the identity provider cookie stored by the local agent.

Transmitting the first request to the first service provider and intercepting, at the local agent, the first traffic between the first application and the identity provider includes defining, with the local agent and at the client device, a routing definition to cause the first traffic and the second traffic directed to the identity provider to be intercepted by the local agent, intercepting, by the local agent, a first redirect message from the first service provider via the first application, the first redirect message including a uniform resource locator (URL) of the identity provider, the URL of the identity provider including a domain name of the identity provider, determining if the identity provider cookie is stored by the local agent, and based at least in part on the local agent not storing the identity provider cookie and the routing definition, transmitting the first redirect message to the identity provider. The operations further include, based at least in part on the local agent not storing the identity provider cookie, performing a domain name system (DNS) lookup, the DNS lookup returning a second IP address of the identity provider, and transmitting the first redirect message to the identity provider. The operations further include, based at least in part on the validation of the credentials during the authentication process, receiving a third redirect message from the identity provider, the third redirect message including the identity provider cookie, and transmitting the third redirect message to the first application, the first application installing the identity provider cookie. The operations further include transmitting the third redirect message to the first service provider. The operations further include, based at least in part on the first service provider validating the identity provider cookie, receiving a service provider cookie from the service provider at the first application, and receiving the first services from the first service provider at the first application based at least in part on the validation of the service provider cookie.

The operations further include receiving the third redirect message from the second service provider via the second application, the third redirect message, as modified by the second application, including the first IP address of the client device, and determining if the identity provider cookie is stored by the local agent. The operations further include based at least in part on the local agent storing the identity provider cookie, performing a name resolution process, the name resolution process returning the second IP address of the identity provider, adding the identity provider cookie stored by the local agent to the first redirect message, and transmitting the second redirect message to the identity provider. The operations further include receiving a fourth redirect message from the identity provider, the fourth redirect message validating the identity provider cookie, transmitting the fourth redirect message to the second application, the second application installing the identity provider cookie, and transmitting the fourth redirect message to the second service provider. The operations further include, based at least in part on the second service provider validating the identity provider cookie, receiving a service provider cookie from the service provider at the first application, and receiving the second services from the second service provider at the second application based at least in part on the validation of the service provider cookie.

Transmitting the first request to the first service provider and intercepting, at the local agent, the first traffic between a first application and an identity provider includes defining, at the client device, a routing definition including interception of the first traffic and the second traffic to the identity provider by the local agent, receiving a first redirect message from the identity provider via the first service provider via and the first application, and determining if the identity provider cookie is stored by the local agent. The operations further include based at least in part on the local agent not storing the identity provider cookie, transmitting the first redirect message to the identity provider. The operations further include determining if the first application is local to the client device. The operations further include, based at least in part on the validation of the credentials during the authentication process, receiving a third redirect message from the identity provider via the first application, the third redirect message including the identity provider cookie, storing, with the local agent, the copy of the identity provider cookie, and transmitting the third redirect message to the first service provider. The operations further include receiving the second redirect message from the second service provider via the second application and the identity provider and determining if the identity provider cookie is stored by the local agent. The operations further include, based at least in part on the local agent storing the identity provider cookie, transmitting a fourth redirect message to the identity provider for validation via the second application, the fourth redirect message including instructions to install the identity provider cookie on the second application, transmitting the fourth redirect message to the second service provider and determining if the second application is local to the client device. The operations further include, based at least in part on the second service provider validating the identity provider cookie, receiving a service provider cookie from the service provider at the second application, and receiving the second services from the second service provider at the second application based at least in part on the validation of the service provider cookie.

The identity provider is a single sign-on (SSO) server, and the local agent is a subdomain of the identity provider. The first application and the second application are of different types of applications executed via different computer-executable code.

Examples described herein also provide a method of performing a single sign-on, including transmitting, on behalf of a first application executed on a client device, a first request to a first service provider via a network, the first request requesting first services from the first service provider, intercepting, at a local agent, first traffic between a first application and an identity provider, the local agent acting as a proxy identity provider, performing an authentication process as to the identity provider, receiving an identity provider cookie from the identity provider based on a validation of credentials during the authentication process, storing, with the local agent, a copy of the identity provider cookie, transmitting, on behalf of a second application executed on the client device, a second request to a second service provider via the network, the second request requesting second services from the second service provider, intercepting, at the local agent, second traffic between the second application and the identity provider, adding the identity provider cookie to the second traffic, and receiving validation to access the second service provider from the identity provider based on the identity provider cookie stored by the local agent. The first application and the second application install the identity provider cookie.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 illustrates a system-architecture diagram 100 of a client device 102 that utilizes a local agent 106, according to an example of the principles described herein. The system architecture may include a client device 102 communicatively coupled to a single sign-on server 108 and a number of service providers 110 via a network 112. The client device 102 may be any computing device that may be utilized by a user. For example, the client device may include, a workstation, a desktop computer, a laptop, a tablet, a network appliance, an e-reader, a smartphone, a server, a switch, a router, a hub, a bridge, a gateway, a modem, a repeater, an access point, a virtual machine, or other computing devices and virtual (e.g., emulated) machines requesting services from the service providers 110.

The client device 102 may include a plurality of application(s) 104-1, 104-2, . . . 104-N, where N is any integer greater than or equal to 1 (collectively referred to herein as application(s) 104 unless specifically addressed otherwise). The applications are abbreviated herein as App A 104-A, App B 104-B, and App N 104-N. The applications 104 may include any computer-executable and/or computer-readable code. Further, the applications 104 may include any computer-executable and/or computer-readable code that authenticate using the same single-sign-on server such as, for example, the identity provider 108 (e.g., idp.enterprise.com) depicted in FIG. 1. Thus, throughout this description, the single sign-on server is equivalent to the identity provider 108; hence "idp.enterprise.com." Thus, the methods and systems described herein allow for authenticating once for the same or different application executed on the client device 102 where the different applications are from different user agents. In other words, a single sign-on server 108 may be used to authenticate different client applications executed on the client device 102.

Further, the applications 104 described herein may be of different types executed via different computer-executable code. For example, the applications 104 may include a network browsing application, an electronic mail (email) application, a blog client application, a teleconferencing or video conferencing application, a payment service application, a personal information system application, an individual media editing application, a social media application, an application suite bundled together in a single software package (e.g., word processing applications, spreadsheet applications, email applications, etc. bundled together), enterprise software (e.g., enterprise resource planning software, customer relationship management (CRM) software, supply chain management software, time management, resource management, analytical, collaborative, and documentation tools, etc.), enterprise infrastructure software (e.g., software that supports enterprise software systems such as, for example, databases, email servers, and systems for managing networks and security), application platform as a service (aPaaS) (e.g., cloud computing services that allow for development and deployment environments for application services), content access software (e.g., media players, web browsers, help browsers, etc.), educational software (e.g., evaluation or testing software, progress tracking software, collaboration software, etc.), simulation software (e.g., augmented reality software, virtual reality software, mixed reality software, computer-mediated reality software, etc.), media development software (e.g., graphic-art software, desktop publishing software, multimedia development software, hypertext markup language (HTML) editors, digital-animation editors, digital audio and video composition, etc.), product engineering software (e.g., computer-aided design (CAD), computer-aided engineering (CAE), computer language editing and compiling tools, integrated development environments, application programmer interfaces, three-dimensional (3D) modeling software, etc.), entertainment software (e.g., video gaming software, screen saver software, programs to display motion pictures or play recorded music, etc.). In the examples described herein, the applications (App A 104-A, App B 104-B, and/or App N 104-N), the services they connect to via the service provider 110 (e.g., sp.com), and the identity provider 108 (e.g., idp.enterprise.com) are not and do not need to be aware of the presence of the local agent 106 (local.idp.enterprise.com) that serves as a proxy identity provider since the processing as to the local agent 106 is performed as a background process. Further, the local agent (local.idp.enterprise.com) 106, serving as the proxy identity provider, may only proxy for applications on the host on which the local agent 106 is executed. In the examples described herein, the local agent 106 (local.idp.enterprise.com) may intercept any traffic that flows from any application 104 executable on the client device 102 to the identity provider 108 (e.g., idp.enterprise.com) but does not intercept any other communications such as communications from the applications 104 to the service providers 110 that do not also go through the identity provider 108, and communications from the identity provider 108 to the service providers 110. Stated another way, the local agent 106 (local.idp.enterprise.com) is located between the path of the applications 104 and the identity provider 108 (e.g., idp.enterprise.com), and not between any other path or call flow.

The local agent 106 included within the client device 102 serves as a proxy identity provider that has relatively less functionality as the main or real identity provider 108. The local agent may function as a single sign-on server agent acting as a "cookie jar" that stores and manages cookies (e.g., key/value pairs) obtained in connection with the applications 104. Thus, the local agent 106 may not implement or be programmed to implement all the functionality of the identity provider 108. Further, the local agent may have an address of local.idp.enterprise.com, whereas the identity provider 108 may have the address of idp.enterprise.com. In one example, the local agent 106 may be any software, firmware, daemon, or other executable code that is executable by a processor of the client device 102.

The single sign-on (SSO) server 108 is also referred to herein as an identity provider. The SSO 108 may be any authentication hardware and/or software executed on a server device or similar computing device intermediary between the client device 102 and the service providers 110. The SSO 108 allows a user to log in with a single identifier and password (key/value pair) to any of several related, yet independent, service providers 110. A single sign-on may be achieved over an internet protocol (IP) network such as the network 112 using cookies. As described herein, the SSO 108 servers to allow for a single sign on to function across different client applications 104 and different service providers 110. This is useful when applications other than or in addition to a browser, for example, also interact with the external services provided by the service providers 110.

In one example, the communications between the client device 102 including the applications described herein (e.g., Application A (App A) 104-A, Application B (App B) 104-2, Application N, (App N) 104-N)) and the local agent (local.idp.enterprise.com) 106, the identity provider 108 (e.g., idp.enterprise.com), and the service provider 110 may be performed using any communication protocol including, for example, hypertext transfer protocol (HTTP).

In the examples described herein, any number of applications 104 may be provided services by any number of service providers 110. In this example, the number of applications 104 may be provided services by a number of service providers 110 that is less than, equal to, or greater than the number of applications 104. Further, as described herein, the applications 104 may be of different types such that the applications 104 request services from a plurality of different service providers 110, respectively. Thus, the service provider 110 (sp.com) may be different for different applications 104 being executed by the client device 102. For example, where App A 104-A is an email application, the service provider 100 may be an email server service such as, for example, the Microsoft Exchange Server developed and distributed by Microsoft Corporation. In contrast, where App B 104-B is a browser application, the service provider 100 may be a web server service such as, for example, the Google search Microsoft Exchange Server developed and distributed by Microsoft Corporation. In this manner, the applications 104 may be executed on the client device 102 and obtain a true single sign-on between the applications while using different services provided by the service providers 110. The service providers 110 include at least two different service providers 110 that may be accessed via the SSO 108 to provide at least two different services to the applications 104.

Figure 2:
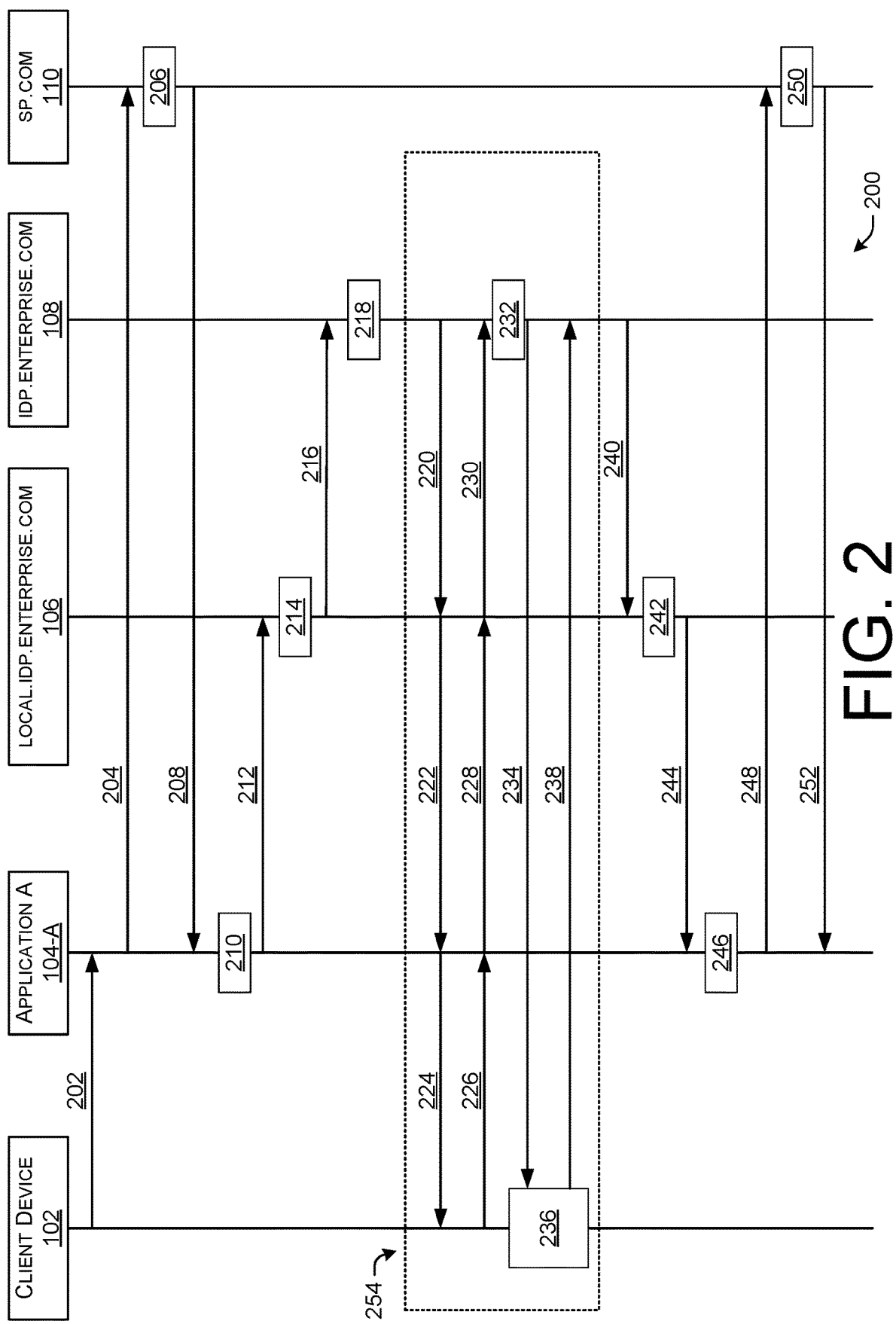
FIG. 2 illustrates a call flow diagram of a first application authenticating to a service provider, according to an example of the principles described herein.
Figure 3:
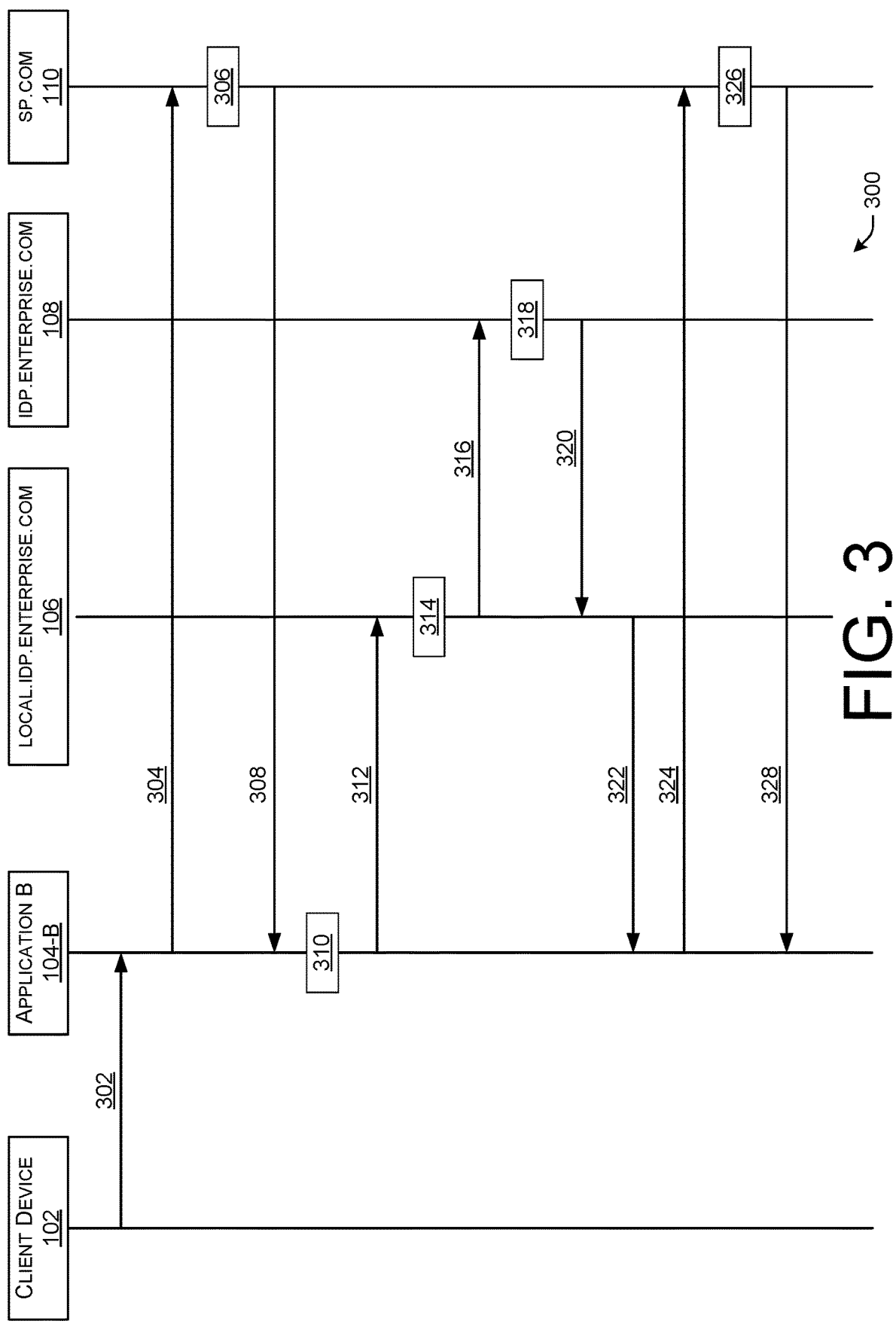
FIG. 3 illustrates a call flow diagram of a second application authenticating to the service provider based on authentication of the first application, according to an example of the principles described herein.

FIG. 2 illustrates a call flow diagram 200 of a first application App A 104-A authenticating to a service provider 110, according to an example of the principles described herein. FIG. 3 illustrates a call flow diagram 300 of a second application App B 104-B authenticating to the service provider 110 (or a separate service provider 110) based on authentication of the first application App A 104-A as to the identity provider 108, according to an example of the principles described herein. As described in more detail herein, because App A 104-A may be authenticated via the identity provider 108 as to a first service provider 110, the same authentication as to the identity provider may be applied for App B 104-B when App B 104-B seeks to obtain resources for a second service provider 110. In the example of FIGS. 2 and 3, the local agent 106 (e.g., local.idp.enterprise.com) may be started before any applications 104 attempt to authenticate to the service provider 110 (e.g., sp.com). Further, in the example of FIGS. 2 and 3, the name of the local agent 106 is not used in the exchanges described in FIGS. 2 and 3. The local agent 106 arranges to intercept all communication by the locally-executed applications 104 for the identity provider 108 (e.g., idp.enterprise.com), while retaining the ability to communicate to the "official" identity provider 108 (e.g., idp.enterprise.com). This proxy processing provided by the local agent 106 will only proxy traffic for the identity provider 108. The local agent 106 may also install a self-signed certificate locally that allows the local agent 106 to authenticate to locally-executed applications 104 as if it were the identity provider 108 (e.g., idp.enterprise.com). In an example, the local agent 106 may do this in a number of ways. In one example, the local agent 106 may install a name-to-address binding that maps the name idp.enterprise.com to the local address of the local agent 106. For example, on a Linux operating system developed and distributed by community developers, for example, the name-to-address binding may be performed by making an entry in the "/etc/hosts" file. The "/etc/hosts" file includes a mapping of internet protocol (IP) addresses to uniform resource locators (URLs), and these mapping entries in the /etc/hosts file may be used to override the IP-address-to-URL mapping returned by a server such as, for example, the service provider 110 (e.g., sp.com) and/or the identity provider 108 (e.g., idp.enterprise.com).

In another example, the local agent 106 may install a route that directs traffic for the address of the identity provider 108 (e.g., idp.enterprise.com) to the local address (e.g., local.idp.enterprise.com) of the local agent 106. In the examples described in connection with FIGS. 2 and 3, only traffic for the identity provider 108 is to be intercepted by the local agent 106.

At 202, the client device 102 executes or starts Application A (App A) 104-A. In the examples described herein, before any attempt by an application 104 is made to contact a service provider 110, the local agent 106 may make arrangements on the client device 102 (by, for example, requesting an operating system of the client device 102 to modify the local routing infrastructure, or by some other means) to have any traffic whose destination is the identity provider 108 delivered to the local agent 106 instead of to the identity provider 108 (the identity provider 108 being remote from the client device 102 and the applications 104). The local agent 106 may ensure that the local device 106 and the applications 104 can continue to communicate with the identity provider 108. This, in effect, places the local agent 106 between the applications 106 and the identity provider 108 so the local agent 106 can intercept the authentication material (e.g., cookies) for use with other applications 104 that are subsequently seeking resources from the service providers 110.

App A 104-A sends, at 204, a first request to access services provided by a service provider 110 located at, for example, sp.com by sending the first request to the service provider 110. At 206, the service provider 110 determines whether authentication information is available in the first request from App A 104-A. The result of 206 is that the service provider 110 indicated that the authentication information (e.g., SPCookie) is not available. In other words, the client device 102 and/or App A 104-A are not yet authenticated as to the service provider 110. Thus, the service provider 110 redirects the first request to the identity provider 108 (e.g., idp.enterprise.com) at 208 by sending a security assertion markup language (SAML) request to App A 104-A. SAML is a communication standard for exchanging authentication and authorization data between parties, and, in this example, between the identity provider 108 and the service provider 110 and is an XML-based markup language used for security assertions including statements that a service provider 110 may use to make access-control decisions At 210, the SAML request is intercepted by App A 104-A, and App A 104-A performs a domain name server (DNS) lookup process (e.g., a name resolution processes) for the IP address of the identity provider 108 (e.g., idp.enterprise.com). The DNS lookup process results in the return of the IP address of the client device 102 such as, for example, "127.0.0.1" (also referred to as "localhost") instead of the actual address of the identity provider 108. In this manner, App A 104-A modifies the DNS parameters. App A 104-A sends the SAML request on to the local agent 106 via, for example, a function such as the function Get_idp.enterprise-.com at 212.

At 214, the local agent 106 may determine if it has the identity provider cookie (e.g., IdPCookie). In this example, the local agent 106 does not have the identity provider cookie (e.g., IdPCookie). If the local agent 106 did, however, have the identity provider cookie (e.g., IdPCookie), then multi-factor authentication may be avoided. Assuming in this example that the local agent 106 does not have the identity provider cookie (e.g., IdPCookie), the local agent 106, at 214, also performs a DNS lookup process to identify the IP address of the identity provider 108 and uses the real IP address of the identity provider 108 in forwarding the SAML request to the identity provider 108. The local agent 106 uses the real IP address of the identity provider 108 to send the SAML request on to the identity provider 108 via, for example, a function such as the function Get_idp.enterprise.com at 212. Because the local agent 106 will manipulate the manner in which the identity provider 108 is addressed, the local agent 106 may perform the DNS lookup process to identify the IP address of the identity provider 108 at any time after startup of the client device 102. Thus, in the examples described herein, the local agent 106 may perform the DNS lookup process before it modifies a routing table associated with the network destinations within the network 100 for all applications 104 executed by the client device 102 to ensure that the routing tables are properly updated and to ensure that the local agent 106, itself, does not need a previous version of the routing table any longer. Further, in one example, the local agent 106 may perform the DNS lookup process upon startup of the client device 102, when the execution of the application 104 is begun, or at other points within the call flows described herein.

Figure 6:
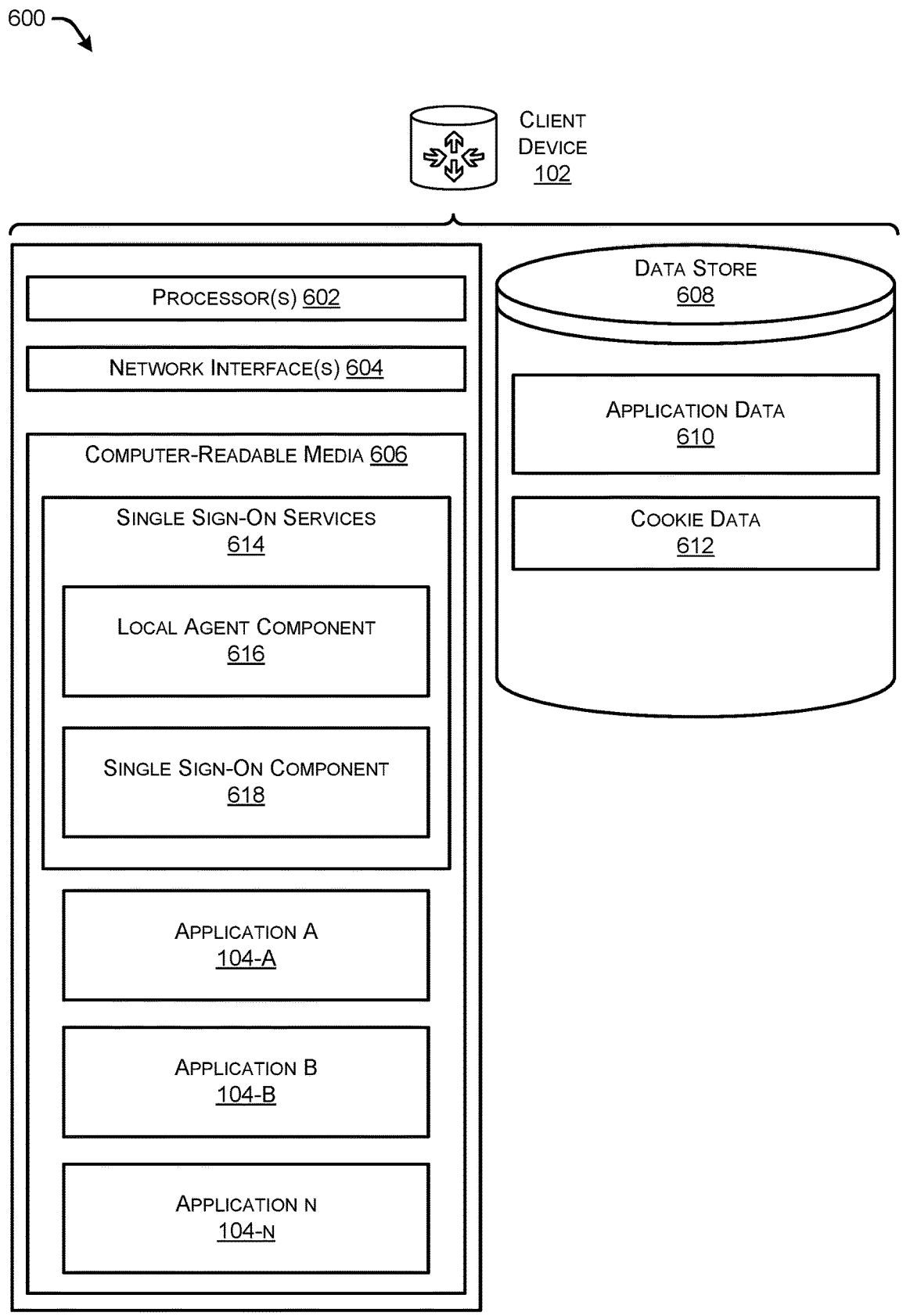
FIG. 6 is a component diagram of example components of a client device including a local agent, according to an example of the principles described herein.

In one example, the local agent 106 may modify, update, or define a routing table stored in a data storage device (e.g., the data store 608 including as the application data 610 of FIG. 6) of create any form of routing definition such that all traffic from the applications 104 to the identity provider 108 are intercepted by the local agent 106. The routing definition also defines that the local agent 106 does not intercept any other traffic, communications, or messages including between the applications 104 and the service provider 110, between the service provider 110 and the local applications 104, between the identity provider 108 and the service provider 110, and between the service provider 110 and the identity provider 108. In this manner, the local agent 106 may operate without knowledge of the service provider 110, the identity provider 108, the client device 102, or combinations thereof.

In one example, the local agent 106 may ensure that the IP address of the local agent 106 is included within the routing table to ensure that all traffic from the applications 104 to the identity provider are sent to and intercepted by the local agent 106. In this example, the address of the identity provider 108 is not modified, but, instead, the local agent 106 ensures that the address of the identity provider 108 points to the local agent 106. This is performed locally since this operation cannot be performed outside of the client device 102. Although this example is described in connection with the example process of FIGS. 2 and 3, this example may also apply to the example process of FIGS. 4 and 5.

In one example, the local agent 106 may determine the DNS name of the identity provider 108, and ensure within the routing table that the DNS name of the identity provider 108 maps to the local agent. In this example, when traffic is sent to the identity provider 108 from the applications 104, the local agent 106 performs the DNS lookup process (e.g., a name resolution processes), finds the IP address for the identity provider 108, a modifies the identity mapping within the routing table such that the IP address indicated is replaced with the IP address of the local agent 106. This ensures that local messages from the applications 104 local to the client device 102 go through the local agent 106 so that the local agent 106 can intercept the communications from the applications 104 to the identity provider 108 remote from the client device 102. In this manner, the name to address look-up is modified in order to point to the local agent 106. In one example, this name-to-address mapping may utilize an operating system file that translates hostnames or domain names to IP addresses such as /etc/hosts. Although this example may be applied in connection with the example process of FIGS. 4 and 5, this example may also apply to the example process of FIGS. 2 and 3.

At 216, the redirect is completed at the identity provider 108, and at 218, the identity provider 108 determines if the identity provider cookie (e.g., IdPCookie) is included within the SAML request. In this example, the identity provider cookie (e.g., IdPCookie) is not included within the SAML request, and, therefore, at 220 through 238, a 424, a multi-factor authentication (MFA) process is performed. The identity provider 108 requests a user of the client device 102 for authentication because the request is coming from the local agent 106 and because the request does not include the identity provider cookie (e.g., IdPCookie). At this point, the identity provider 108 may perform the MFA as indicated by the processes included within dashed box 254. As described above in connection with FIG. 4, the MFA is an authentication method in which a user of the client device 102 is granted access to services provided by the service provider 110 only after successfully presenting two or more pieces of evidence (or factors) to an authentication mechanism. For example, the user is to present knowledge in the form of something the user and only the user knows, possession in the form of something the user and only the user has, and inherence in the form of something the user and only the user is. In this manner, MFA protects the client device 102 from an unknown person attempting to access data stored on the client device 102 such as personal identification details or financial assets.

At 220, a login request is sent to the client device 102 via the local agent 106 at 222 and the App A 104-A at 224. Thus, as part of the user interface (UI) displayed by App A 104-A, a login forum is forwarded from the identity provider 108 to the local agent 106 displayed on a display device of the client device 102 at 224. The user may enter credentials such as, for example, a username and password, among other types of credentials via the UI at 226. At 228 and 230, App A 104-A and the local agent 106 post the credentials to the identity provider 108, and at 232, the credentials are validated by the identity provider 108.

Assuming the credentials are validated by the identity provider 108, at 234, a push notification may be sent to an MFA application for authentication at 236. In one example, the MFA application may be, for example, DUO multi-factor authentication application developed and distributed by Cisco Systems, Inc. The MFA application, at 238, may provide an MFA response to the identity provider 108. At this point, App A 104-A is validated and has passed the MFA process.

In one example, the local agent 106 may include two separate DNS sessions with a first DNS session with App A 104-A and a second DNS session with the identity provider 108. Therefore, in this example, the local agent 106 may not be required to handle encryption and/or decryption processes as to the SAML statement since there are two separate TLS sessions. At this point, the local agent 106 has a transport layer security (TLS) TLS session with the client application 104 executed on the client device 102, and any communication between the local agent 106 and the application 104 may be encrypted (e.g., sent over hypertext transfer protocol secure (HTTPS) with a different key. The same process may be applied to the communication between the local agent 106 and the SSO server (e.g., the identity provider 108). The local agent 106 does not interpret the SAML request for validation or signing purposes, nor does the local agent 106 extract information from the SAML request. However, the local agent 106 may decrypt and re-encrypt any messages sent over HTTPS including any SAML requests.

At 240, the local agent 106 intercepts a SAML response from the identity provider 108 sent as an assertion via the first DNS session. In the examples of FIGS. 2 and 3, the identity provider 108 is not aware of the existence of the local agent 106. The identity provider 108, rather, begins a redirect to the service provider 110. However, the SAML message will go through the local agent 106 due to the TLS session between the identity provider 108 (acting as the SSO server) and the local agent 106.

The SAML response at 240 includes a setcookie function (e.g., set_cookie: IdPCookie) that sets the cookie (e.g., authentication information) for access to the identity provider 108 as "IdPCookie," for example.

The IdP cookie does not serve as an access to the service provider, and, instead the service provider cookie (e.g., SPCookie) performs this function. The identity provider cookie (e.g., IdPCookie) identifies the session between the client device 102 and the identity provider 108 (e.g., the SSO server). When the identity provider 108 receives a future request for another service provider 110 coming from the same user agent (e.g., the same browser application, for example), the identity provider cookie (e.g., IdPCookie) prevents the user from the need to perform a separate MFA.

At 242, the local agent 106 stores a copy of the identity provider cookie (e.g., IdPCookie) within local storage of, for example, the client device 102. At 244, the local agent 106 forwards a SAML response including the setcookie function (e.g., set_cookie: IdPCookie) to App A 104-A via the second TLS session.

When App A 104-A receives the SAML response via the redirect at 240 and 244, App A 104-A installs the identity provider cookie (e.g., IdPCookie) at 246 for all domains within the identity provider 108 (e.g., *.idp.enterprise.com) including any subdomains thereof including local.idp.entrprise.com on the client device 102. This allows all subdomains of the identity provider 108 (e.g., via the wildcard "*.idp.enterprise.com") to receive the IdPCookie over a secure channel since the cookie is secure. As mentioned above, the identity provider cookie (e.g., IdPCookie) in this example may be referred to as a domain cookie as opposed to a host-only cookie. A domain cookie is used to specify a domain. If a domain name was not specified in the identity provider cookie (e.g., IdPCookie), then the identity provider cookie (e.g., IdPCookie) would be interpreted as a host-only cookie and would be sent to only one subdomain; the subdomain that created the cookie in the first instance. Therefore, by utilizing the identity provider cookie (e.g., IdPCookie), the identity provider cookie (e.g., IdPCookie) may be sent to all subdomains within the domain (e.g., idp.enterprise.com including local.idp.enterprise.com).

The local agent 106 may store the identity provider cookie (e.g., IdPCookie) in a data storage device of the client device 102, for example. In one example, the data storage device in which the local agent 106 stores the identity provider cookie (e.g., IdPCookie) may be an isolated data store so that the identity provider cookie (e.g., IdPCookie) is isolated from access by other applications. Further, in one example, local agent 106 may encrypt the identity provider cookie (e.g., IdPCookie), and, in this example, the local agent 106 may have a key to decrypt the encrypted cookie.

By installing the identity provider cookie (e.g., IdPCookie) at 246, the App A 104-A may now be able to access the service provider 110. In order to do so, another redirect process may include, at 248, sending another SAML response to the service provider 110 with a function or attribute that identifies the service provider 110 (e.g., sp.com). In one example, the function may include Get_sp.com/service.php. At 250, the service provider 110 will interpret the response from the App A 104-A, validate the SAML response, and generate a service provider cookie (e.g., SPCookie).

At 252, the service provider 110 may send resources requested by App A 104-A to App A 104-A. Further, at 252, the service provider 110 includes a setcookie function (e.g., set_cookie: SPCookie) to send the service provider cookie (e.g., SPCookie) from the service provider 110 to the user agent including the client device 102, App A 104-A, and/or the local agent 106 so these elements can send the service provider cookie (e.g., SPCookie) back to the service provider 110 in future communications. In the scenario of FIG. 2, the service provider 110 (e.g., sp.com) and the identity provider 108 (e.g., idp.enterprise.com) are made unaware of the processing, protocols, call flows, and/or existence of the local agent 106 (e.g., local.idp.enterprise.com) within the overall network 100. Thus, the processing of FIG. 2 occurs transparently as to the service provider 110 (e.g., sp.com) and the identity provider 108 (e.g., idp.enterprise.com).

Having described the process by which a first application (e.g., App A 104-A) is authenticated as to the service provider 110, FIG. 3 illustrates a call flow diagram of a second application (e.g., App AB 104-B) authenticating to the service provider based on authentication of the first application (e.g., App A 104-A), according to an example of the principles described herein. As mentioned above, because the identity provider cookie (e.g., IdPCookie) is available at the local agent 106 of the client device 102, the identity provider cookie (e.g., IdPCookie) may also be used by the second application (e.g., App B 104-B) as well.

At 302 of FIG. 3, the client device 102 executes or starts Application B (App B) 104-B. App B 104-B sends, at 304, a first request to access services provided by a service provider 110 located at, for example, sp.com by sending a first request to the service provider 110. At 304, App B 104-B may send the first request to the service provider 110 with a function or attribute that identifies the service provider 110 (e.g., sp.com). In one example, the function may include Get_sp.com/service.php. At 306, the service provider 110 determines whether authentication information is available in the first request from App B 104-B. In this instance, the authentication information such as, for example, the service provider cookie (e.g., SPCookie), is determined to not be available. In other words, App B 104-B is not yet authenticated as to the service provider 110. Thus, the service provider 110 redirects the first request to the identity provider 108 (e.g., idp.enterprise.com) at 308 by sending a security assertion markup language (SAML) request to App B 104-B.

At 310, the SAML request is intercepted by App B 104-B, and App B 104-B performs a DNS lookup process for the IP address of the identity provider 108 (e.g., idp.enterprise.com). The DNS lookup process results in the return of the IP address of the client device 102 such as, for example, "127.0.0.1" (also referred to as "localhost") instead of the actual address of the identity provider 108. In this manner, App B 104-B modifies the DNS parameters. App B 104-B sends the SAML request on to the local agent 106 via, for example, a function such as the function Get_idp.enterprise.com at 312.

At 314, the local agent 106 intercepts the communication from App B 104-B and validates the SAML request, and adds the identity provider cookie (e.g., IdPCookie) stored at the local agent 106 to the SAML request in preparation for redirecting the SAML request to the identity provider 108. As described above, the local agent 106 obtained and stored the identity provider cookie (e.g., IdPCookie) at 242 of FIG. 2 when the first application App A 104-A was being validated.

Further, at 314, the local agent 106 also performs a DNS lookup process to identify the IP address of the identity provider 108 and uses the real IP address of the identity provider 108 in forwarding the SAML request to the identity provider 108. The local agent 106 uses the real IP address of the identity provider 108 to send the SAML request on to the identity provider 108 via, for example, a function such as the function Get_idp.enterprise.com at 314.

At 316, the redirect is completed at the identity provider 108, and at 318, the identity provider 108 validates the identity provider cookie (e.g., IdPCookie). At 320, the identity provider 108 begins a redirect to the local agent 106 using another SAML response as an assertion via a first DNS session between the identity provider 108 and the local agent 106. The SAML response at 320 may include a setcookie function (e.g., set_cookie: IdPCookie) that sets the cookie (e.g., authentication information) for access to the identity provider 108 as "IdPCookie," for example. This identity provider cookie (e.g., IdPCookie) may be useful in situations where different identifiers may be needed for different user agents. Those identifiers work between the applications 104 and the identity provider 108, but not the service providers 110.

At 322, the local agent 106 forwards the SAML request including the a setcookie function (e.g., set_cookie: IdPCookie) to App B 104-B via a second DNS session between the local agent 106 and App B 104-B.

When App B 104-B receives the SAML response via the redirect at 320 and 322, App B 104-B which, at 324 sends the SAML response to the service provider 110 with a function or attribute that identifies the service provider 110 (e.g., sp.com). In one example, the function may include Get_sp.com/service.php. At 326, the service provider 110 may parse the SAML response from the App B 104-B, and generate a service provider cookie (e.g., SPCookie).

At 328, the service provider 110 may include a setcookie function (e.g., set_cookie: SPCookie) in a response in order to send the service provider cookie (e.g., SPCookie) from the service provider 110 to the user agent including the client device 102, App B 104-B, and/or the local agent 106 so these elements can send the service provider cookie back to the service provider 110 in future communications. Further, the service provider 110 may send resources requested by App B 104-B to App B 104-B. As mentioned above, in the scenario of FIGS. 2 and 3, the service provider 110 (e.g., sp.com) and the identity provider 108 (e.g., idp.enterprise.com) are made unaware of the processing, protocols, call flows, and/or existence of the local agent 106 (e.g., local.idp.enterprise.com) within the overall network 100. Thus, the processing of FIG. 3 occurs transparently as to the service provider 110 (e.g., sp.com) and the identity provider 108 (e.g., idp.enterprise.com).

In the examples of FIGS. 2 through 5, the traffic that is rerouted through the local agent 106 is that traffic that may be routed through the identity provider 108. This creates a situation where the local agent 106 becomes a proxy single sign-on server as to the identity provider which serves as the main or real single sign-on server. Further, the local agent 106 may also install a self-signed certificate locally that allows the local agent 106 to authenticate to local applications 104 as idp.enterprise.com. Still further, the traffic sent from the service provider 110 is never routed via the local agent 106.

Figure 4:
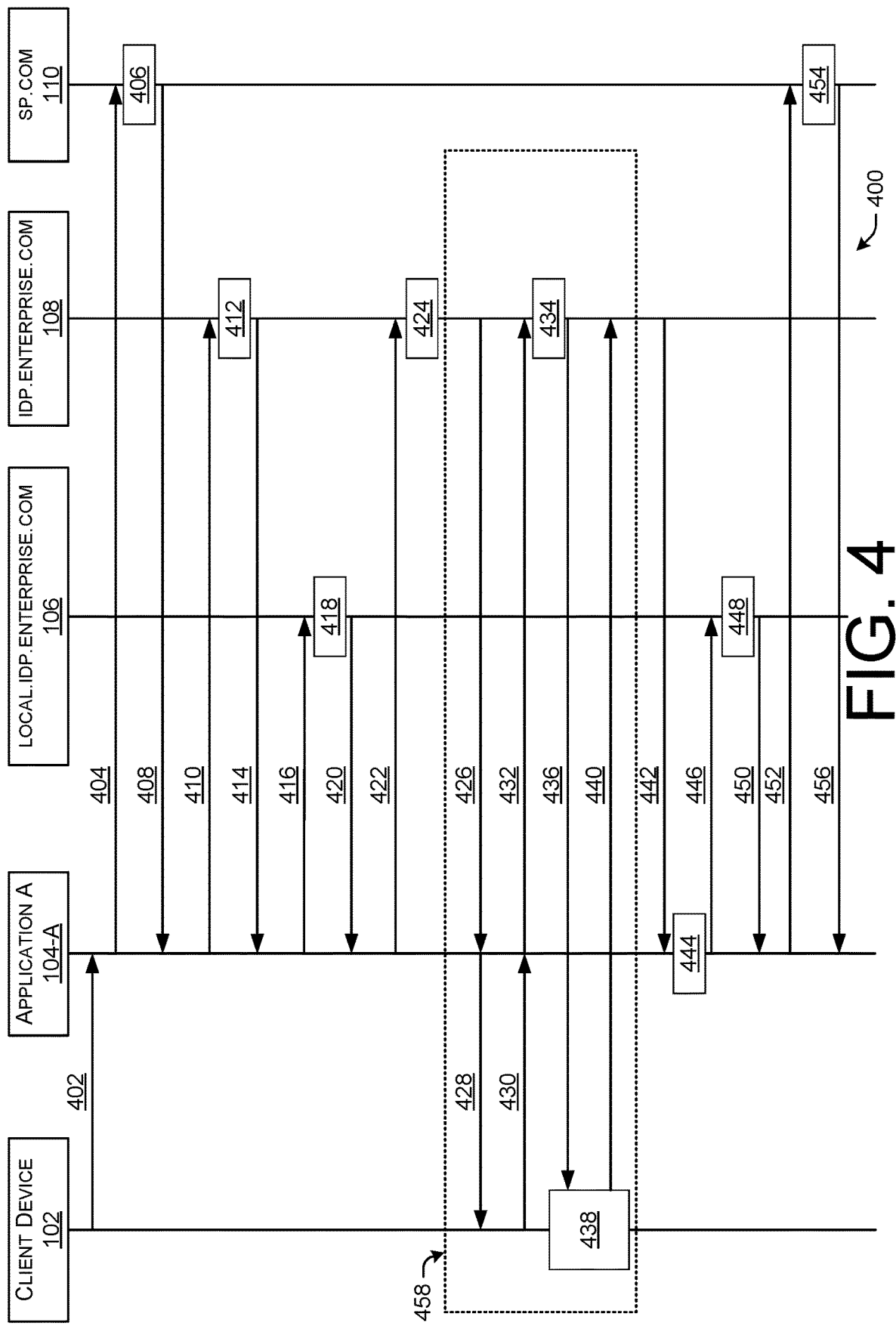
FIG. 4 illustrates a call flow diagram of a first application authenticating to the service provider, according to an example of the principles described herein.
Figure 5:
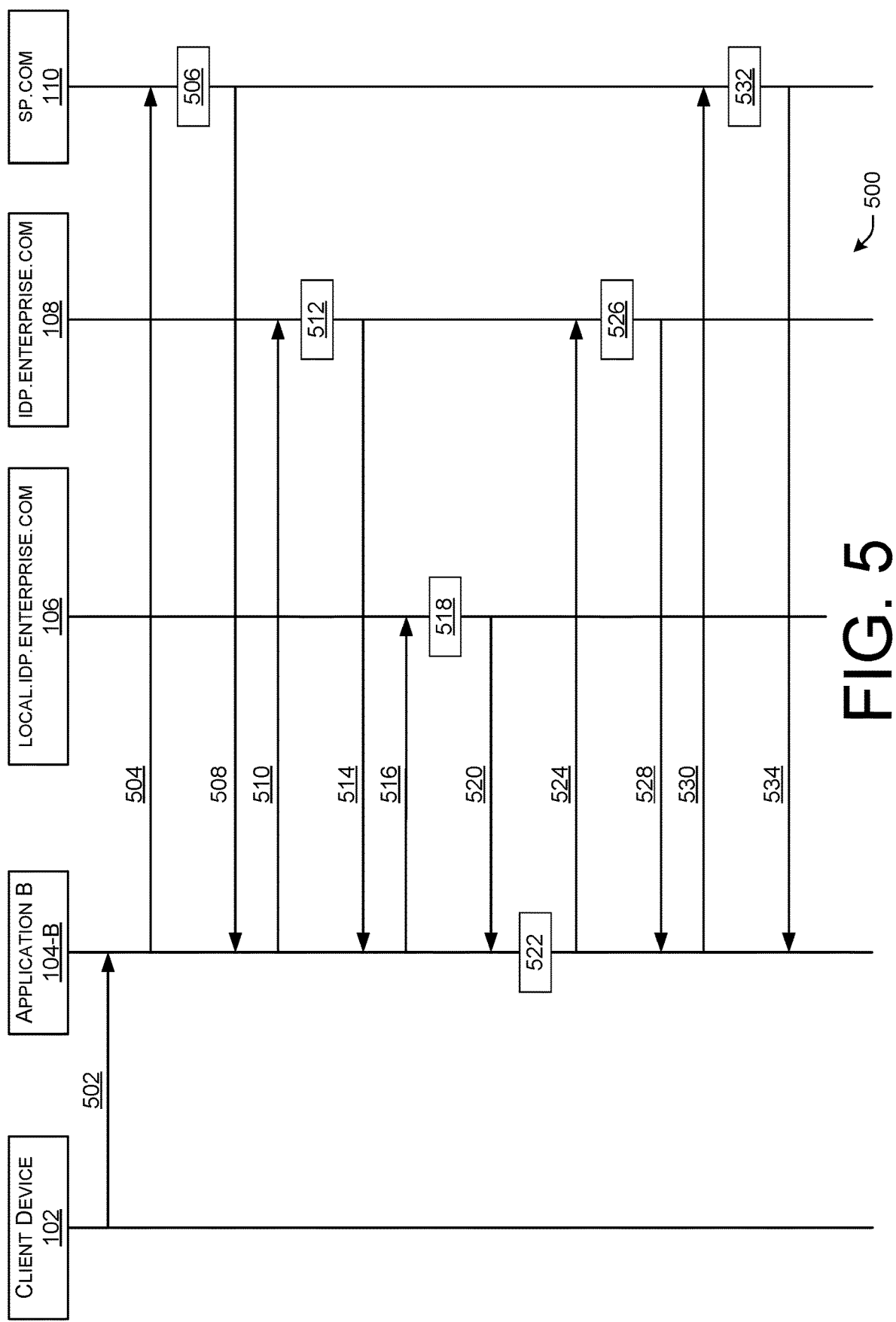
FIG. 5 illustrates a call flow diagram of a second application authenticating to the service provider based on authentication of the first application, according to an example of the principles described herein.

In contrast to the example of FIGS. 4 and 5, the example of FIGS. 2 and 3 described above create a situation where the identity provider 108 (e.g., idp.enterprise.com) as well as the service provider 110 (e.g., sp.com) is not made aware of the processing, protocols, call flows, and/or existence of the local agent 106 (e.g., local.idp.enterprise.com) within the overall network 100, and only the client device 102 on which the local agent 106 is executed aware of the local agent 106 and its processing, protocols, and/or call flows. In the example of FIGS. 2 and 3, the local agent 106 acts to ensure that all communications intended to go to or be redirected to the identity provider 108 (e.g., idp.enterprise.com) is, instead, sent to itself at local.idp.enterprise.com by intercepting communications between the applications 104 and the identity provider 108. In this example, the local agent 106 may forward messages to the identity provider 108 by inserting itself into the path between any messages sent between the applications 104 and the identity provider 108.

To differentiate between the example of FIGS. 4 and 5 and the example of FIGS. 2 and 3, the example of FIGS. 4 and 5 include the sending of a request to the service provider 110, the service provider 110 redirecting to the identity provider 108, and the identity provider 108, being aware of the client device 102 having the local agent 106 installed thereon, performing a second redirect to the local agent 106. In the example of FIGS. 4 and 5, the address of the local agent 106 is localhost because the local agent 106 must be executed on the client device 102. If the local agent in the example of FIGS. 4 and 5 were located on a different client device, significant security issues may arise. Therefore, the redirect address to the local agent 106 is 127.0.0.1; the address of the client device 102. However, the name of the address of the local agent 106 may still remain as local.idp.enterprise.com or similar local address.

FIG. 4 illustrates a call flow diagram 400 of a first application 104-A authenticating to a service provider 110, according to an example of the principles described herein. In connection with the authentication of the first application 104-A in FIG. 4, FIG. 5 illustrates a call flow diagram 500 of a second application 104-B authenticating to the service provider 110 based on authentication of the first application 104-A, according to an example of the principles described herein. As described herein, because an identity provider cookie (e.g., IdPCookie) is available at the local agent 106 of the client device 102, the identity provider cookie (e.g., IdPCookie) may also be used by the second application (e.g., App B 104-B) for authentication purposes as well. The client device 102 executes and manages the local agent 106 which is tasked with storing the authentication cookies (e.g., the identity provider cookie (e.g., IdPCookie) and/or the service provider cookie (e.g., SPCookie)) that allow seamless sign-on for the identity provider 108 (e.g., idp.enterprise.com). Because the local applications (e.g., App A 104-A and App B 104-2) and service providers 110 should not be modified in any way to engage local.idp.enterprise.com into the sign-on process, an alternative process to bring the local agent 106 into the authentication process is provided via the systems and methods described herein in connection with FIGS. 4 and 5 as a first example and FIGS. 2 and 3 as a second example. In the example of FIGS. 4 and 5, collaboration from the identity provider 108 (e.g., idp.enterprise.com) is enlisted.

At 402, the client device 102 executes or starts Application A (App A) 104-A. App A 104-A sends, at 404, a first request to access services provided by a service provider 110 located at, for example, sp.com by sending a first request to the service provider 110. At 406, the service provider 110 determines whether authentication information is available in the first request from App A 104-A. In one example, the authentication information may include data defining a cookie. A cookie may be any data stored on the client device 102 by an application (e.g., Application A 104-A and/or Application B 104-2) while accessing services provided by the service provider 110. The authentication information (e.g., the cookie) identifies a session between the service provider 110 and App A 104-A. The data defining the cookie may include authentication information that defines permissions provided to the client device 102 with respect to the service provider 110. Further, the data defining the cookie may include data defining an activity associated with the application 104-A, 104-2, a state of the client device 102 as to the service provider 110, and information previously-entered into form fields, among other types of cookie-related data.

The result of 406 is that the service provider 110 indicated that the authentication information (e.g., SPCookie) is not available. In other words, the client device 102 and/or App A 104-A are not yet authenticated as to the service provider 110. Thus, the service provider 110 redirects the first request to the identity provider 108 (e.g., idp.enterprise.com) at 408 by sending a security assertion markup language (SAML) request to App A 104-A. App A 104-A sends the SAML request to the identity provider 108 at 410 to complete the redirect. In this manner, the service provider 110 uses the redirect process to move the request to a different website or other source where authentication of the client device 102 and/or App A 104-A may take place. A separate redirect process may be used in later processing to then redirect the App A 104-A back to the service provider 110.

At 412, the identity provider 108 determines if a cookie such as, for example, an identity provider cookie (e.g., IdPCookie) is available. In this example, the identity provider 108 determines that the IdPCookie is not available and commences to redirect to the local agent 106. In other words, the client device 102 and/or App A 104-A are not yet authenticated as to the identity provider 108. Thus, at 414, the identity provider 108 redirects the first request to the local agent 106 (e.g., local.idp.enterprise.com) by sending the received SAML request to App A 104-A, and, at 416, App A 104-A sends the SAML request to the local agent 106 to complete the redirect.

At 418, the local agent 106 may determine whether the application making the request to the service provider 110 is a local application such as, for example, App A 104-A instead of another application that is not local to the client device 102. In some instances, the local agent 106 may receive requests from other, non-local applications running on other client devices behind the client device 102. For example, these other non-local applications may be running on client devices that are spoofing the IP address of the client device 102 (e.g., 127.0.0.1, the loopback Internet protocol (IP) address also referred to as the localhost). Thus, at 418, the local agent 106 validates the incoming connections. If the local agent 106 determines that App A 104-A is a locally executed application, the local agent 106 redirects the first request to the identity provider 108 and includes in the redirect a uniform resource locator (URL) parameter (e.g., from_local_idp=true) indicating to the identity provider 108 that App A 104-A is locally executed. In one example, the determination at 418 may be made by the local agent 106 determining whether the IP address for the request from the application is the IP address of the client device 102 (e.g., 127.0.0.1) and not some other local IP address.

Also, at 418, the local agent 106 determines if App A 104-A has the identity provider cookie (e.g., IdPCookie). Since this is a first authentication of the client device 102 and/or App A 104-A, App A 104-A does not have the identity provider cookie (e.g., IdPCookie). Thus, another redirect process is performed in order for the identity provider 108 to request authentication.

Thus, at 420, the redirect from the local agent 106 to the identity provider 108 is performed via another SAML request including the URL parameter (e.g., from_local_idp=true). The URL parameter (e.g., from_local_idp=true) is not a unique identifier because the parameter may be added to the URL. The URL parameter does not involve any signature to identify the client device 102 or the local agent 106 addition of this. However, Further, the URL parameter (e.g., from_local_idp=true) acts to distinguish between the redirect processes that occurs at 410 and the present redirect that occurs at 422. At 422, the redirect is completed at the identity provider 108.

At 424, the identity provider 108 requests a user of the client device 102 for authentication because the request is coming from the local agent 106 and because the request does not include the identity provider cookie. At this point, the identity provider 108 may perform multi-factor authentication (MFA) as indicated by the processes included within dashed box 458. MFA is an authentication method in which a user of the client device 102 is granted access to services provided by the service provider 110 only after successfully presenting two or more pieces of evidence (or factors) to an authentication mechanism. For example, the user is to present knowledge in the form of something the user and only the user knows, possession in the form of something the user and only the user has, and inherence in the form of something the user and only the user is. In this manner, MFA protects the client device 102 from an unknown person attempting to access data stored on the client device 102 such as personal identification details or financial assets. The MFA process is described in connection with 426 through 440.

At 426, a login request is sent to App A 104-A. As part of the user interface (UI) displayed by App A 104-A, a login forum is displayed on a display device of the client device 102 at 428. The user may enter credentials such as, for example, a username and password, among other types of credentials via the UI at 430. At 432, App A 104-A posts the credentials to the identity provider 108, and at 434, the credentials are validated by the identity provider 108.

Assuming the credentials are validated by the identity provider 108, at 436, a push notification may be sent to an MFA application for authentication at 438. In one example, the MFA application may be, for example, DUO multi-factor authentication application developed and distributed by Cisco Systems, Inc. The MFA application, at 440, may provide an MFA response to the identity provider 108. At this point, App A 104-A is validated and has passed the MFA process.

At 442, the identity provider 108 begins a redirect to the local agent 106 using another SAML response as an assertion. The SAML response at 442 includes a setcookie function (e.g., set_cookie: IdPCookie) that sets the cookie (e.g., authentication information) for access to the identity provider 108 as "IdPCookie," for example, as described above. At 444, when App A 104-A receives the SAML response via the redirect at 442, App A 104-A installs the IdPCookie for all domains within the identity provider 108 (e.g., *.idp.enterprise.com) including any subdomains thereof including local.idp.entrprise.com. This allows all for subdomains of the identity provider 108 (e.g., via the wildcard "*.idp.enterprise.com") to receive and install the IdPCookie over a secure channel since the cookie is secure. In this manner, when the SAML response is redirected to the local agent 106 (e.g., local.idp.entrprise.com) at 446, the local agent 106 will install the IdPCookie as well. The identity provider cookie (e.g., IdPCookie) in this example may be referred to as a domain cookie as opposed to a host-only cookie. A domain cookie is used to specify a domain. If a domain name was not specified in the identity provider cookie (e.g., IdPCookie), then the identity provider cookie (e.g., IdPCookie) would be interpreted as a host-only cookie and would be sent to only one subdomain; the subdomain that created the cookie in the first instance. Therefore, by utilizing the identity provider cookie (e.g., IdPCookie), the identity provider cookie (e.g., IdPCookie) may be sent to all subdomains within the domain (e.g., idp.enterprise.com including local.idp.enterprise.com).

The local agent 106 may store the identity provider cookie (e.g., IdPCookie) in a data storage device of the client device 102, for example. In one example, the data storage device in which the local agent 106 stores the identity provider cookie (e.g., IdPCookie) may be an isolated data store so that the identity provider cookie (e.g., IdPCookie) is isolated from access by other applications. Further, in one example, local agent 106 may encrypt the identity provider cookie (e.g., IdPCookie), and, in this example, the local agent 106 may have a key to decrypt the encrypted cookie.

By installing the identity provider cookie (e.g., IdPCookie), the local agent 106 may now be able to access the service provider 110. In order to do so, another redirect process may include, at 450, sending another SAML response to App A 104-A. At 452, App A 104-A may send the SAML response to the service provider 110 with a function or attribute that identifies the service provider 110 (e.g., sp.com). In one example, the function may include Get_sp.com/service.php. Thus, instead of redirecting the response at 450 and 452 to the identity provider 108 (e.g., idp.enterprise.com), the local agent 106 redirects directly to the service provider 110. In one example, the relay state (e.g., RelayState) attribute of the SAML response serves as an identifier for the destination device, and, in this example, may identify the service provider 110 as the destination. At 454, the service provider 110 will interpret the response from the local agent 106, validate the SAML response, and generate a service provider cookie (e.g., SPCookie).

At 456, the service provider 110 may send resources requested by App A 104-A to App A 104-A. Further, at 456, the service provider 110 includes a setcookie function (e.g., set_cookie: SPCookie) to send the service provider cookie (e.g., SPCookie) from the service provider 110 to the user agent including the client device 102, App A 104-A, and/or the local agent 106 so these elements can send the service provider cookie back to the service provider 110 in future communications.

In the present example as well as the examples described herein, the identity provider cookie (e.g., IdPCookie) and/or the service provider cookie (e.g., SPCookie) may be session cookies (non-persistent cookies) where the cookies are effective for as long as the application associated with the cookie is accessing the service provider 110. In this example, the cookies do not have an expiration date assigned to them. In another example, the identity provider cookie (e.g., IdPCookie) and/or the service provider cookie (e.g., SPCookie) may be persistent cookies where, instead of expiring when the application terminates communication with the service provider 110, expire at or after a defined time period. In this example, for the persistent cookies' entire lifespans, their information will be transmitted to the service provider 110 every time the user visits the website (e.g., sp.com) and its associated servers that the cookies belong to, and/or every time the user views a resource belonging to that website from another website (such as an advertisement).

Having described the process by which a first application (e.g., App A 104-A) is authenticated as to the service provider 110, FIG. 5 illustrates a call flow diagram of a second application (e.g., App AB 104-B) authenticating to the service provider based on authentication of the first application (e.g., App A 104-A), according to an example of the principles described herein. As mentioned above, because the identity provider cookie (e.g., IdPCookie) is available at the local agent 106 of the client device 102, the identity provider cookie (e.g., IdPCookie) may also be used by the second application (e.g., App B 104-B) as well.

The client device 102 executes and manages the local agent 106 which is tasked with storing the authentication cookies (e.g., the identity provider cookie (e.g., IdPCookie) and/or the service provider cookie (e.g., SPCookie) that allow seamless sign-on for the identity provider 108 (e.g., idp.enterprise.com). Because the local applications (e.g., App A 104-A and App B 104-2) and service providers should not be modified in any way to engage local.idp. enterprise.com into the sign-on process, an alternative process to bring the local agent 106 into the authentication process is provided via the systems and methods described herein in connection with FIGS. 4 and 5 as a first example and FIGS. 2 and 3 as a second example. In the example of FIGS. 4 and 5, collaboration from the identity provider 108 (e.g., idp.enterprise.com) is enlisted.

At 502, the client device 102 executes or starts Application B (App B) 104-B. App B 104-B sends, at 504, a first request to access services provided by a service provider 110 located at, for example, sp.com by sending a first request to the service provider 110. At 504, App B 104-B may send the first request to the service provider 110 with a function or attribute that identifies the service provider 110 (e.g., sp.com). In one example, the function may include Get_sp.com/service.php. At 506, the service provider 110 determines whether authentication information is available in the first request from App B 104-B. In this instance, the authentication information such as, for example, the service provider cookie (e.g., SPCookie), is determined to not be available. In other words, App B 104-B is not yet authenticated as to the service provider 110. Thus, the service provider 110 redirects the first request to the identity provider 108 (e.g., idp.enterprise.com) at 508 by sending a security assertion markup language (SAML) request to App B 104-B.

As part of the redirect from the service provider 110 to the identity provider 108 (e.g., idp.enterprise.com) via App B 104-B, App B 104-B sends the SAML request to the identity provider 108 at 510 to complete the redirect. In this manner, the service provider 110 uses the redirect process to move the request to a different website or other source where authentication of App B 104-B may take place. A separate redirect process may be used in later processing to then redirect the App B 104-B back to the service provider 110. In one example, at 510, the SAML request may include a function or attribute that identifies the identity provider 108 (e.g., idp.enterprise.com) such as, for example, the function Get_idp.enterprise.com.

At 512, the identity provider 108 determines if a cookie such as, for example, an identity provider cookie (e.g., IdPCookie) is available. In this example, the identity provider 108 determines that the IdPCookie is not available and commences to redirect to the local agent 106. In other words, App B 104-B is not yet authenticated as to the identity provider 108. Thus, at 514, the identity provider 108 redirects the first request to the local agent 106 (e.g., local.idp.enterprise.com) by sending a SAML request to App B 104-B, and, at 516, App B 104-B sends the SAML request to the local agent 106 to complete the redirect. At 516, the SAML request may include a function or attribute that identifies the local agent 106 (e.g., local.idp.enterprise.com) such as, for example, the function Get_local.idp.enterprise.com.

At 518, the local agent 106 may determine whether the application making the request to the service provider 110 is a local application such as, for example, App B 104-B instead of another application that is not local to the client device 102. In some instances, the local agent 106 may receive requests from other, non-local applications running on other client devices behind the client device 102. For example, these other non-local applications may be running on client devices that are spoofing the IP address of the client device 102 (e.g., 127.0.0.1, the loopback Internet protocol (IP) address also referred to as the localhost). Thus, at 518, the local agent 106 validates the incoming connections. If the local agent 106 determines that App B 104-B is a locally executed application, the local agent 106 redirects the first request to the identity provider 108 and includes in the redirect a uniform resource locator (URL) parameter (e.g., from_local_idp=true) indicating to the identity provider 108 that App B 104-B is locally executed. In one example, the determination at 518 may be made by the local agent 106 determining whether the IP address for the request from the application is the IP address of the client device 102 (e.g., 127.0.0.1) and not some other local IP address.

Also, at 518, the local agent 106 determines if App B 104-B has the identity provider cookie (e.g., IdPCookie). Since this is a first authentication of the App B 104-B, App B 104-B does not have the identity provider cookie (e.g., IdPCookie). Therefore, the local agent 106 provides the identity provider cookie (e.g., IdPCookie) to App B 104-B. In one example, the local agent 106 may add the identity provider cookie (e.g., IdPCookie) to a set-cookie header for all domains within the identity provider 108 (e.g., *.idp.enterprise.com) including any subdomains thereof including local.idp.entrprise.com. Thus, because the local agent 106 has possession of the identity provider cookie (e.g., IdPCookie) due to the processing provided at 448 of FIG. 4, a second application such as App B 104-B may utilize the stored identity provider cookie (e.g., IdPCookie) in its respective validation process. Noted here is the fact that the applications (e.g., App A 104-A, App B 104-B, . . . App N 104-N) may each utilize the identity provider cookie (e.g., IdPCookie) as described herein to authenticate itself as to the service provider 110 and utilize the services provided by the service provider 110.

Further, at 518, the local agent begins a redirect process back to the identity provider 108 (e.g., idp.enterprise.com). Therefore, at 520, another SAML request is sent to App B 104-B. The SAML request includes the setcookie function (e.g., set_cookie: IdPCookie) that sets the cookie (e.g., authentication information) for access to the service provider 110 as "IdPCookie," for example. At 522, App B 104-B installs the IdPCookie for all domains within the identity provider 108 (e.g., *.idp.enterprise.com) including any subdomains thereof including local.idp.enterprise.com.

At 524, the redirect is completed at the identity provider 108. In one example, at 524, the SAML request may include a function or attribute that identifies the identity provider 108 (e.g., idp.enterprise.com) such as, for example, the function Get_idp.enterprise.com. At 526, the identity provider validates the identity provider cookie (e.g., IdPCookie), and, at 528, the identity provider sends another redirect message (e.g., another SAML response) on to the service provider 110 via App B 104-B. App B 104-B, at 530, App B 104-B sends the redirect message on to the service provider 110 (e.g., sp.com). At 530, the SAML request may include a function or attribute that identifies the service provider 110 (e.g., sp.com) such as, for example, the function Get_sp.com/service.php.

At 532 the service provider 110 will interpret the response from App B 104-B, validate the SAML response, and generate a service provider cookie (e.g., SPCookie). At 524, the service provider 110 may send resources requested by App B 104-B to App B 104-B. Further, at 524, the service provider 110 includes the setcookie function (e.g., set_cookie: SPCookie) to send the service provider cookie (e.g., SPCookie) from the service provider 110 to the user agent including the client device 102, App B 104-B, and/or the local agent 106 so these elements can send the service provider cookie back to the service provider 110 in future communications. In this manner, because the identity provider cookie (e.g., IdPCookie) is had at the local agent 106, the identity provider cookie (e.g., IdPCookie) may be used by subsequent applications such as App B 104-B and App N 104-N without requiring a subsequent login or credential process.

In the example of FIGS. 4 and 5, the service provider 110 (e.g., sp.com) is unaware of the processing, protocols, call flows, and/or existence of the local agent 106 (e.g., local.idp.enterprise.com) within the overall network 100. However, the identity provider 108 (e.g., idp.enterprise.com), functioning as the single sign-on server, is aware of the local agent 106 because the identity provider 108 redirects to the local agent 106.

Further, in the example of FIGS. 4 and 5, the client device 102 may authenticate the local agent 106 since the client device 102 is not aware that the processes performed by the local agent 106 are occurring. In one example, the client device 102 may authenticate the local agent 106 when the client device 102 is creating a transport layer security (TLS) connection to the local agent 102. In creating the TLS connection with the client device 102, the local agent 106 may present a certificate to the client device 102 that identifies the local agent 106 as being located on the client device 102 (e.g., the local host). As described herein, the local agent 106 installs a self-signed certificate locally (e.g., at the client device 102) that allows the local agent 106 to authenticate to the local applications 104 as the proxy identity provider (e.g., loca.idp.enterprise.com) to proxy for the identity provider 108. Thus, in this example, the local agent 106 is to reside on and be executed by the client device 102.

In the examples of FIGS. 2 through 5, local configuration on the client device 102 may be the relied upon without requiring any modification to the applications 104, the service provider 110 (e.g., sp.com), or the identity provider 108 (e.g., idp.enterprise.com). This allows for a user or administrator to more easily incorporate the functionality of the local agent 106 into their network 100, making the use of the present systems and methods more user friendly. In the examples of FIGS. 2 through 5, communications from the service provider 110 to the identity provider 108 are sent to the local agent 106, and the local agent 106 will communicate with the identity provider 108 on behalf of the client device 102.

The examples of FIGS. 2 through 5 provide a proxy identity provider that may be executed on any host client device to allow all applications executed thereon to share a single-sign-on state created by a first authentication operation triggered by a first application to contact a service provider. The proxy identity provider may be installed in a way that neither application code, nor service provider code, nor identity provider code is to be modified in any way. In on example, the proxy identity provider executed with "superuser" (root, administrator, admin, or supervisor) authority for the client device 102 on which it is executed.

FIG. 6 is a component diagram 600 of example components of a client device 102 including a local agent 112, according to an example of the principles described herein. As illustrated, the client device 102 may include one or more hardware processor(s) 602 configured to execute one or more stored instructions. The processor(s) 602 may comprise one or more cores. Further, the client device 102 may include one or more network interfaces 604 configured to provide communications between the client device 102 and other devices, such as devices associated with the system architecture of FIG. 1 including the network 112, the identity provider 108, the service providers 110, and/or other systems or devices associated with the client device 102 and/or remote from the client device 102. The network interfaces 604 may include devices configured to couple to personal area networks (PANs), wired and wireless local area networks (LANs), wired and wireless wide area networks (WANs), and so forth. For example, the network interfaces 604 may include devices compatible with the client devices 102, network 112, the identity provider 108, the service providers 110 and/or other systems or devices associated with the client device 102.

The client device 102 may also include computer-readable media 606 that stores various executable components (e.g., software-based components, firmware-based components, etc.). In one example, the computer-readable media 606 may include, for example, working memory, random access memory (RAM), read only memory (ROM), and other forms of persistent, non-persistent, volatile, non-volatile, and other types of data storage. In addition to various components discussed herein, the computer-readable media 606 may further store components to implement functionality described herein. While not illustrated, the computer-readable media 606 may store one or more operating systems utilized to control the operation of the one or more devices that comprise the client device 102. According to one example, the operating system comprises the LINUX operating system. According to another example, the operating system(s) comprise the WINDOWS SERVER operating system from MICROSOFT Corporation of Redmond, Washington According to further examples, the operating system(s) may comprise the UNIX operating system or one of its variants. It may be appreciated that other operating systems may also be utilized.

Additionally, the client device 102 may include a data store 608 which may comprise one, or multiple, repositories or other storage locations for persistently storing and managing collections of data such as databases, simple files, binary, and/or any other data. The data store 608 may include one or more storage locations that may be managed by one or more database management systems. The data store 608 may store, for example, application data 610 defining computer-executable code utilized by the processor 602 to execute the applications 104. Further, the application data 610 may include data relating to user preferences associated with the applications 104, passwords, usernames, key/value data, and other data that may be used by the applications 104 to sign on to the services provided by the service providers 110 via the SSO server 108 (e.g., the identity provider 108).

Further, the data store 608 may store a cookie data 612. The cookie data 612 may include any data obtained by the client device 102 regarding the identity provider cookie (e.g., IdPCookie), the service provider cookie (e.g., SPCookie), and any other cookie information that may be used in future sign-on instances and authentications by the applications 104. This cookie data 612 may include, for example, data defining an identity of the client device 102 that requested the services from the service provider 110, the identity of the applications 104 for which the request for services is being made, the identity of the identity provider 108, the service provider(s) 110, and other data described herein that may assist in the authentication processes described herein.

The computer-readable media 606 may store portions, or components, of single sign-on services 614. For instance, the single sign-on services 614 of the computer-readable media 606 may include a local agent component 616 to, when executed by the processor(s) 602, perform proxy single sign-on processes as the local.idp.enterprise.com. The local agent component 616 may intercept redirect messages from the service provider 110 and/or the identity provider 108 in order to obtain, store, and assert the cookie data 612 during an initial and subsequent authentication process as to the applications 104. The local agent component 616 may include all or a portion of the executable code associated with the local agent 106 and may be executed to bring about the functionality of the local agent 106 as described herein.

The computer-readable media 606 may also include the applications 104-A, 104-B, . . . 104-N. The applications 104, when executed by the processor(s) 602, request, obtain and provide to the user of the client device 102 the services associated with the service providers 110 after an initial authentication and subsequent authentication has occurred according to the techniques described herein.

Figure 7:
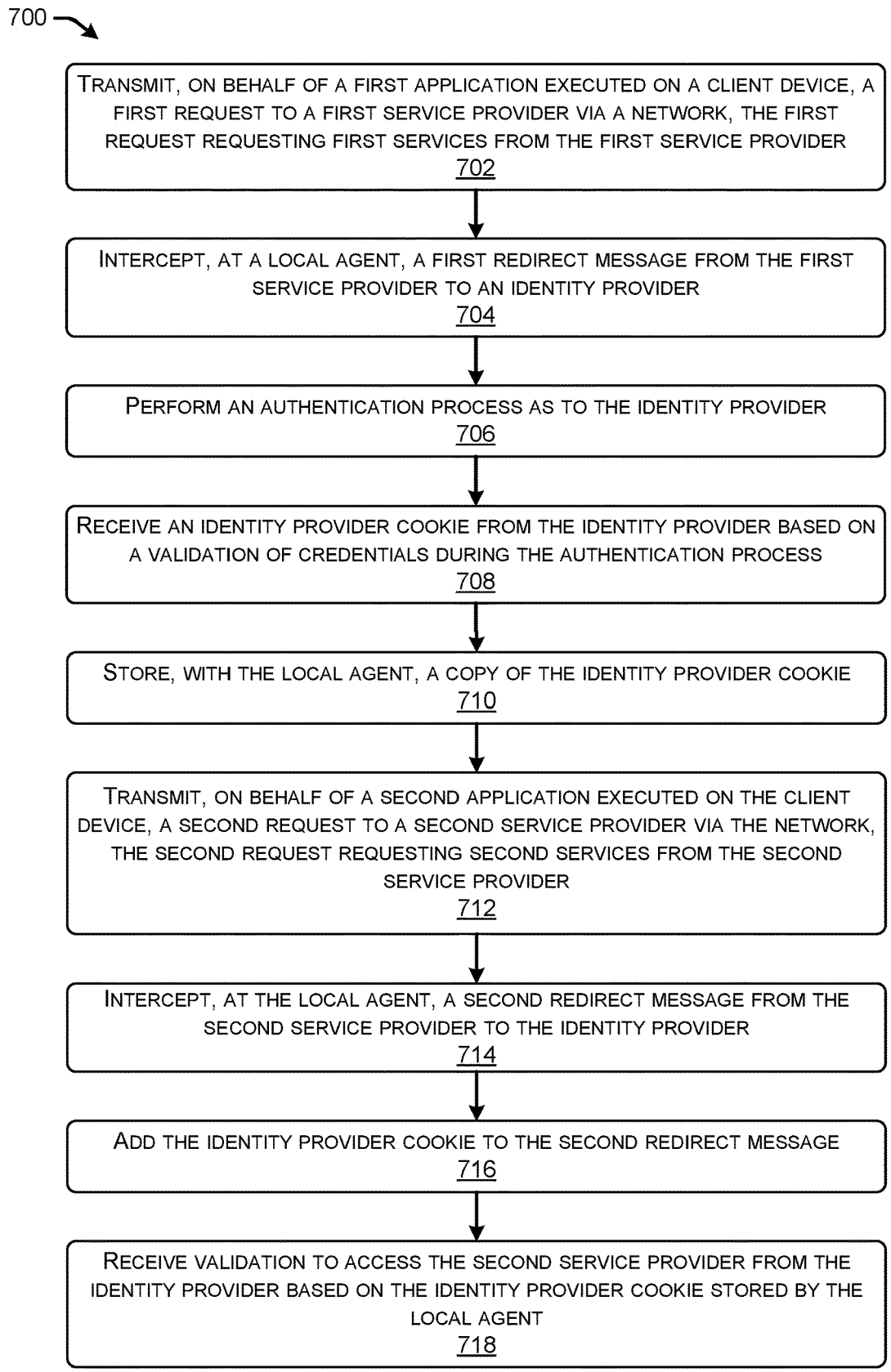
FIG. 7 illustrates a flow diagram of an example method of performing a single sign-on, according to an example of the principles described herein.

FIG. 7 illustrates a flow diagram of an example method 700 of performing a single sign-on, according to an example of the principles described herein. The method of FIG. 7 may track the processes and call flows described above in connection with FIGS. 2 through 5. The method 700 may include, at 702, transmitting, on behalf of a first application 104 executed on the client device 102, a first request to a first service provider 110 via a network 112. The process at 702 may include processes 202 through 206 of FIG. 2 and processes 402 through 406 of FIG. 4. The first request serves to request first services from the first service provider 110.

The local agent 106, at 704, may intercept a first redirect message from the first service provider 110 to the identity provider 108. In this manner, the local agent 106 acts as a proxy identity provider. The process at 704 may include processes 208 through 214 of FIG. 2 and processes 408 through 418 of FIG. 4.

At 706, the method 700 may further include performing an authentication process as to the identity provider 108. The authentication may comprise any authentication processes including, for example, a multi-factor authentication (MFA) process or other authentication processing. The process at 706 may include processes 216 through 238 of FIG. 2 and processes 420 through 440 of FIG. 4.

An identity provider cookie (e.g., IdPCookie) may be received at 708 from the identity provider 108 based on a validation of credentials during the authentication process. The identity provider cookie (e.g., IdPCookie) authorizes the first application 104 in preparation for access to the services provided by the service provider 112. The process at 708 may include processes 240 through 246 of FIG. 2 and processes 442 through 448 of FIG. 4. At 710, the local agent 106, first application 104, and/or the client device 102 may store a copy of the identity provider cookie (e.g., IdPCookie) in for example, the cookie data 612 of the data store 608 of FIG. 6. The process at 710 may include process 242 of FIG. 2 and process 448 of FIG. 4.

The method 700, at 712, may also include transmitting, on behalf of a second application 104 executed on the client device 102, a second request to a second service provider 110 via the network 112. The second request serves to request second services from the second service provider 110. The process at 712 may include processes 302 through 306 of FIG. 3 and processes 502 through 506 of FIG. 5. At 714, the method 700 may further include intercepting, at the local agent 106, a second redirect message from the second service provider 110 to the identity provider 108. The process at 714 may include processes 308 through 314 of FIG. 3 and processes 508 through 518 of FIG. 5.

The local agent 106, at 716 adding the identity provider cookie (e.g., IdPCookie) to the second redirect message. Because the local agent 106, at 710, stored the copy of the identity provider cookie (e.g., IdPCookie), the local agent may add the identity provider cookie (e.g., IdPCookie) to the second redirect message for authentication purposes. The local agent 106 may obtain the copy of the identity provider cookie (e.g., IdPCookie) from the cookie data 612 of the data store 608 of the client device 102 as depicted in FIG. 6. The process at 716 may include processes 316 through 318 of FIG. 3 and processes 520 through 526 of FIG. 5.

The method 700 may further include, at 718, receiving validation to access the second service provider 110 from the identity provider 108 based on the identity provider cookie (e.g., IdPCookie) stored by the local agent 106. The process at 718 may include processes 320 through 328 of FIG. 3 and processes 528 through 534 of FIG. 5.

Figure 8:
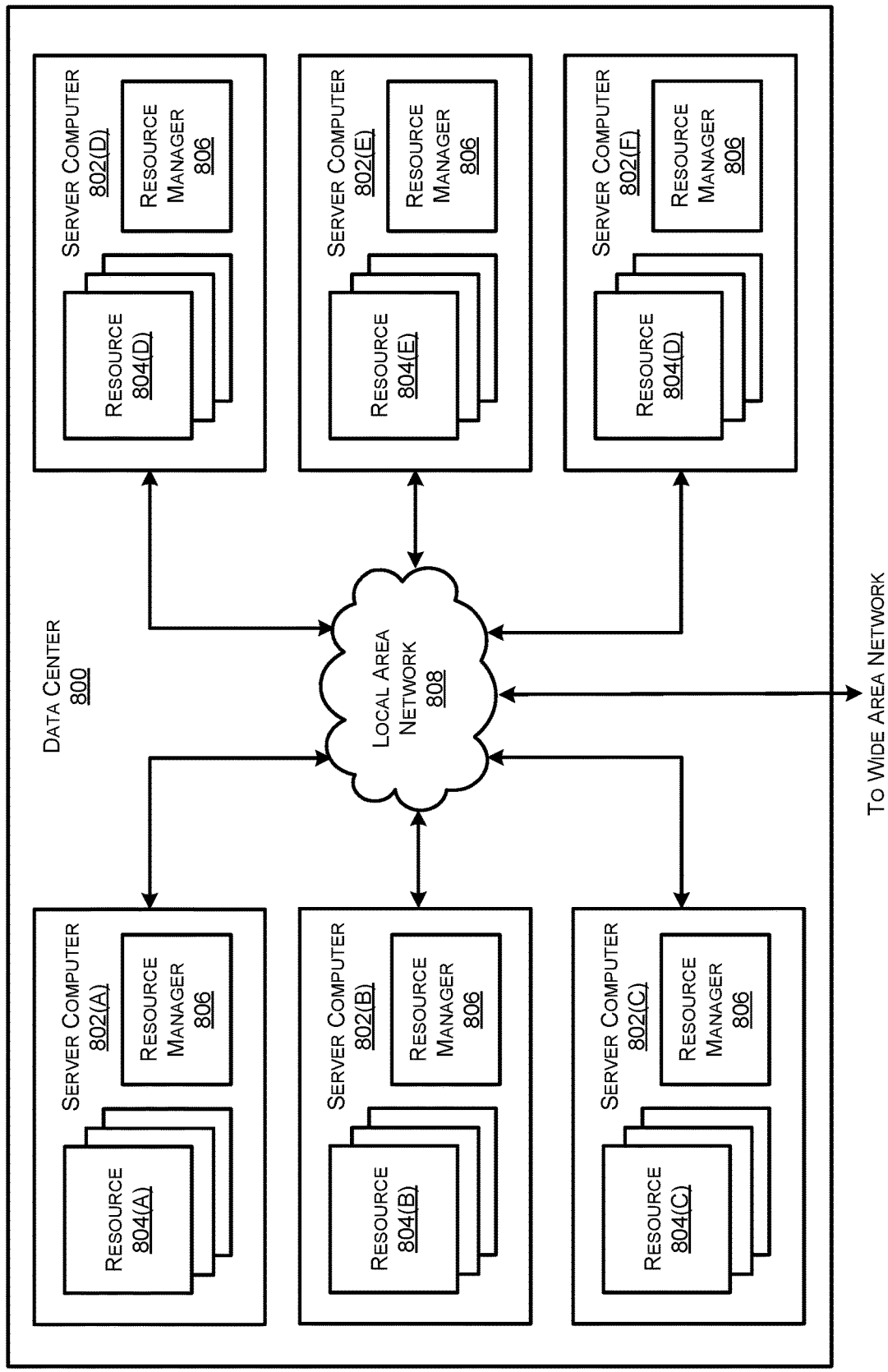
FIG. 8 illustrates a computing system diagram illustrating a configuration for a data center that may be utilized to implement aspects of the technologies disclosed herein.

FIG. 8 illustrates a computing system diagram illustrating a configuration for a data center 800 that may be utilized to implement aspects of the technologies disclosed herein. The example data center 800 shown in FIG. 8 includes several server computers 802A-802F (which might be referred to herein singularly as "a server computer 802" or in the plural as "the server computers 802) for providing computing resources. In some examples, the resources and/or server computers 802 may include, or correspond to, any type of networked device described herein. Although described as servers, the server computers 802 may comprise any type of networked device, such as servers, switches, routers, hubs, bridges, gateways, modems, repeaters, access points, etc.

The server computers 802 may be standard tower, rackmount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, virtual private networks (VPNs), and others. Some of the server computers 802 may also be configured to execute a resource manager 806 capable of instantiating and/or managing the computing resources. In the case of VM instances, for example, the resource manager 806 may be a hypervisor or another type of program configured to enable the execution of multiple VM instances on a single server computer 802. Server computers 802 in the data center 800 may also be configured to provide network services and other types of services.

In the example data center 800 shown in FIG. 8, an appropriate LAN 808 is also utilized to interconnect the server computers 802A-802F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 800, between each of the server computers 802A-802F in each data center 800, and, potentially, between computing resources in each of the server computers 802. It may be appreciated that the configuration of the data center 800 described with reference to FIG. 8 is merely illustrative and that other implementations may be utilized.

In some examples, the server computers 802 and or the computing resources 804 may each execute/host one or more tenant containers and/or virtual machines to perform techniques described herein.

In some instances, the data center 800 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 804 provided by the cloud computing network may include various types of computing resources, such as data processing resources like tenant containers and VM instances, data storage resources, networking resources, data communication resources, network services, VPN instances, and the like.

Each type of computing resource 804 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 804 not mentioned specifically herein.

The computing resources 804 provided by a cloud computing network may be enabled in one example by one or more data centers 800 (which might be referred to herein singularly as "a data center 800" or in the plural as "the data centers 800). The data centers 800 are facilities utilized to house and operate computer systems and associated components. The data centers 800 typically include redundant and backup power, communications, cooling, and security systems. The data centers 800 may also be located in geographically disparate locations. One illustrative example for a data center 800 that may be utilized to implement the technologies disclosed herein is described herein with regard to, for example, FIGS. 1 through 7.

Figure 9:
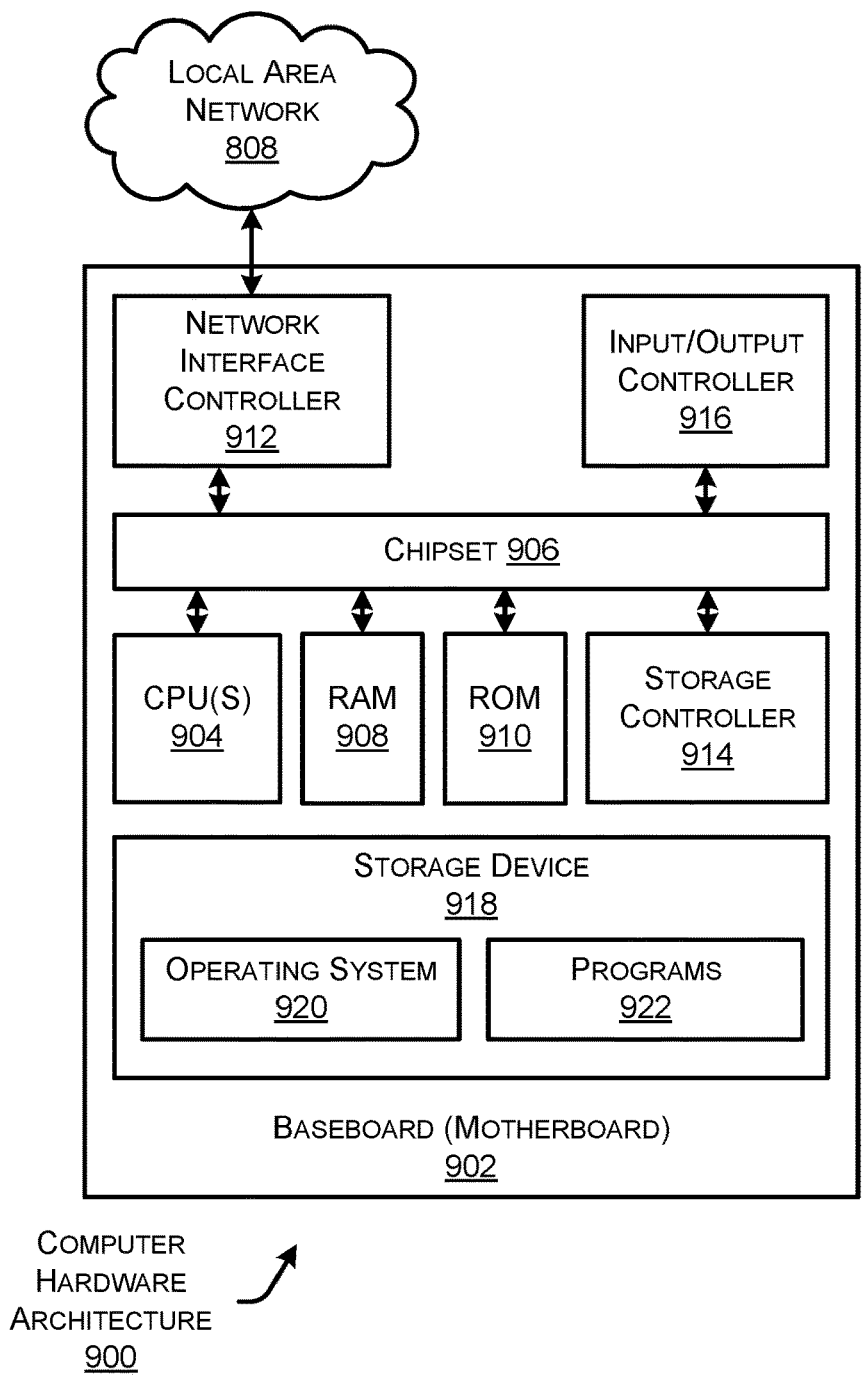
FIG. 9 illustrates a computer architecture diagram showing an example computer hardware architecture for implementing a computing device that may be utilized to implement aspects of the various technologies presented herein.

FIG. 9 illustrates a computer architecture diagram showing an example computer hardware architecture 900 for implementing a computing device that may be utilized to implement aspects of the various technologies presented herein. The computer hardware architecture 900 shown in FIG. 9 illustrates the client device 102, the network 112, the identity provider 108 (e.g., single sign-on server or idp.enterprise.com), the service providers 110, the local agent 106 of the client device 102, and/or other systems or devices associated with the local agent 106 and/or remote from the local agent 106, a workstation, a desktop computer, a laptop, a tablet, a network appliance, an e-reader, a smartphone, or other computing device, and may be utilized to execute any of the software components described herein. The computer 900 may, in some examples, correspond to a network device (e.g., client device 102, the network 112, the identity provider 108 (e.g., single sign-on server or idp.enterprise.com), the service providers 110, and/or the local agent 106 (and associated devices) described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices may be connected by way of a system bus or other electrical communication paths. In one illustrative configuration, one or more central processing units (CPUs) 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory (ROM) 910 or non-volatile RAM (NVRAM) for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the network 112, the client device 102, the identity provider 108, the service providers 110, among other devices. The chipset 906 may include functionality for providing network connectivity through a Network Interface Controller (NIC) 912, such as a gigabit Ethernet adapter. The NIC 912 is capable of connecting the computer 900 to other computing devices within the client device 102 and external to the client device 102. It may be appreciated that multiple NICs 912 may be present in the computer 900, connecting the computer to other types of networks and remote computer systems. In some examples, the NIC 912 may be configured to perform at least some of the techniques described herein, such as packet redirects and/or other techniques described herein.

The computer 900 may be connected to a storage device 918 that provides non-volatile storage for the computer. The storage device 918 may store an operating system 920, programs 922 (e.g., any computer-readable and/or computer-executable code described herein), and data, which have been described in greater detail herein. The storage device 918 may be connected to the computer 900 through a storage controller 914 connected to the chipset 906. The storage device 918 may consist of one or more physical storage units. The storage controller 914 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 900 may store data on the storage device 918 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 918 is characterized as primary or secondary storage, and the like.

For example, the computer 900 may store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the storage device 918 by detecting the physical states or characteristics of one or more particular locations within the physical storage units.

In addition to the storage device 918 described above, the computer 900 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 900. In some examples, the operations performed by the client device 102 and the local agent 106, the network 112, the identity provider 108, the service providers 110, and or any components included therein, may be supported by one or more devices similar to computer 900. Stated otherwise, some or all of the operations performed by the client device 102 and the local agent 106, the network 112, the identity provider 108, the service providers 110, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 918 may store an operating system 920 utilized to control the operation of the computer 900. According to one example, the operating system 920 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 918 may store other system or application programs and data utilized by the computer 900.

In one example, the storage device 918 or other computer-readable storage media is encoded with computer-executable instructions which, when loaded into the computer 900, transform the computer from a general-purpose computing system into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various processes described above with regard to FIGS. 1 through 7. The computer 900 may also include computer-readable storage media having instructions stored thereupon for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, an input/output controller 916 may provide output to a display, such as a computer monitor, a flat-panel display, a digital projector, a printer, or other type of output device. It will be appreciated that the computer 900 might not include all of the components shown in FIG. 9, may include other components that are not explicitly shown in FIG. 9, or might utilize an architecture completely different than that shown in FIG. 9.

As described herein, the computer 900 may comprise one or more of the client devices 102 and the local agent 106, the network 112, the identity provider 108, the service providers 110, and/or other systems or devices associated with the client device 102 and/or remote from the client device 102. The computer 900 may include one or more hardware processor(s) such as the CPUs 904 configured to execute one or more stored instructions. The CPUs 904 may comprise one or more cores. Further, the computer 900 may include one or more network interfaces configured to provide communications between the computer 900 and other devices, such as the communications described herein as being performed by the client device 102 and the local agent 106, the network 112, the identity provider 108, the service providers 110, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 922 may comprise any type of programs or processes to perform the techniques described in this disclosure for the client device 102 and the local agent 106, the network 112, the identity provider 108, the service providers 110 as described herein. The programs 922 may enable the devices described herein to perform various operations.

CONCLUSION

The examples described herein provide a proxy identity provider that may be executed on any host client device to allow all applications executed thereon to share a single-sign-on state created by a first authentication operation triggered by a first application to contact a service provider. The proxy identity provider may be installed in a way that neither application code, nor service provider code, nor identity provider code is to be modified in any way. The proxy identity provider does have to run with "superuser" (root, administrator, admin or supervisor) authority for the client device 102 on which it is executed.

With the above-described systems and methods, users may no longer be forced to type their usernames, passwords, etc. as they execute different applications on their client devices to connect to services provided in by a service provider. This creates a single application that deals with security interactions, and with this approach less trust may be placed in individual applications installed on a host client device. Further, in some examples of utilization of the present systems and methods, the proxy identity provider may be used as a platform for enterprise posture verification such as, in helping determine whether or not users are behaving badly, for example.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A non-transitory computer-readable medium storing instructions that, when executed, causes a processor to perform operations, comprising:
   transmitting, on behalf of a first application executed on a client device, a first request to a first service provider via a network, the first request requesting first services from the first service provider;
   intercepting, at a local agent, first traffic between the first application and an identity provider, the local agent acting as a proxy identity provider and having an internet protocol (IP) address of that of a subdomain of the domain of the identity provider;
   performing an authentication process as to the identity provider; receiving an identity provider cookie from the identity provider based on a validation of credentials during the authentication process;
   storing, with the local agent, a copy of the identity provider cookie;
   transmitting, on behalf of a second application executed on the client device different from the first application, a second request to a second service provider via the network, the second request requesting second services from the second service provider different from the first service provider;
   intercepting, at the local agent, second traffic between the second application and the identity provider; adding the identity provider cookie to the second traffic; and
   receiving validation to access the second service provider from the identity provider based on the identity provider cookie stored by the local agent.

2. The non-transitory computer-readable medium of claim 1, wherein transmitting the first request to the first service provider and intercepting, at the local agent, the first traffic between the first application and the identity provider includes:
   defining, with the local agent and at the client device, a routing definition to cause the first traffic and the second traffic directed to the identity provider to be intercepted by the local agent;
   intercepting, by the local agent, a first redirect message from the first service provider via the first application, the first redirect message including a uniform resource locator (URL) of the identity provider, the URL of the identity provider including a domain name of the identity provider;
   determining if the identity provider cookie is stored by the local agent; and
   based at least in part on the local agent not storing the identity provider cookie and the routing definition, transmitting the first redirect message to the identity provider.

3. The non-transitory computer-readable medium of claim 2, the operations further comprising:
   based at least in part on the validation of the credentials during the authentication process, receiving a second redirect message from the identity provider, the second redirect message including the identity provider cookie;
   transmitting the second redirect message to the first application, the first application installing the identity provider cookie; and
   transmitting the second redirect message to the first service provider.

4. The non-transitory computer-readable medium of claim 3, the operations further comprising:
   based at least in part on the first service provider validating the identity provider cookie:
      receiving a service provider cookie from the service provider at the first application; and
      receiving the first services from the first service provider at the first application based at least in part on the validation of the service provider cookie.

5. The non-transitory computer-readable medium of claim 4, the operations further comprising:
   receiving a third redirect message from the second service provider via the second application, the third redirect message being modified by the second application;
   determining if the identity provider cookie is stored by the local agent; and
   based at least in part on the local agent storing the identity provider cookie:
      performing a name resolution process, the name resolution process returning the URL of the identity provider; and
      adding the identity provider cookie stored by the local agent to the third redirect message; and
   transmitting the third redirect message to the identity provider.

6. The non-transitory computer-readable medium of claim 5, the operations further comprising:
   receiving a fourth redirect message from the identity provider, the fourth redirect message validating the identity provider cookie;
   transmitting the fourth redirect message to the second application, the second application installing the identity provider cookie; and
   transmitting the fourth redirect message to the second service provider.

7. The non-transitory computer-readable medium of claim 6, the operations further comprising, based at least in part on the second service provider validating the identity provider cookie:
   receiving the service provider cookie from the service provider at the first application; and
   receiving the second services from the second service provider at the second application based at least in part on the validation of the service provider cookie.

8. The non-transitory computer-readable medium of claim 2, wherein defining the routing definition includes:
   in a routing table, identifying an internet protocol (IP) address of the identity provider; and
   including a pointer in the routing table, the pointer pointing to an address of the local agent.

9. The non-transitory computer-readable medium of claim 1, wherein transmitting the request to the first service provider and intercepting, at the local agent, the first traffic between the first application and the identity provider includes:
   defining, at the client device, a routing definition including interception of the first traffic and the second traffic to the identity provider by the local agent;
   receiving a first redirect message from the identity provider via the first service provider and the first application;
   determining if the identity provider cookie is stored by the local agent; and
   based at least in part on the local agent not storing the identity provider cookie, with the local agent, transmitting the first redirect message to the identity provider.

10. The non-transitory computer-readable medium of claim 9, wherein defining the routing definition includes:
performing, with the local agent, a name resolution process to determine an internet protocol (IP) address of the identity provider; and
defining an identity mapping within a routing table to map a name of the identity provider with an address of the local agent.

11. The non-transitory computer-readable medium of claim 9, the operations further comprising:
based at least in part on the validation of the credentials during the authentication process, receiving a second redirect message from the identity provider via the first application, the second redirect message including the identity provider cookie;
storing, with the local agent, the copy of the identity provider cookie; and
transmitting the second redirect message to the first service provider.

12. The non-transitory computer-readable medium of claim 11, the operations further comprising:
receiving a third redirect message from the second service provider via the second application and the identity provider;
determining if the identity provider cookie is stored by the local agent;
based at least in part on the local agent storing the identity provider cookie, transmitting a fourth redirect message to the identity provider for validation via the second application, the fourth redirect message including instructions to install the identity provider cookie on the second application; and
transmitting the fourth redirect message to the second service provider.

13. The non-transitory computer-readable medium of claim 12, the operations further comprising, based at least in part on the second service provider validating the identity provider cookie:
receiving a service provider cookie from the service provider at the second application; and
receiving the second services from the second service provider at the second application based at least in part on the validation of the service provider cookie.

14. A client device comprising:
a processor; and
a non-transitory computer-readable media storing instructions that, when executed by the processor, causes the processor to perform operations comprising:
transmitting, on behalf of a first application executed on the client device, a first request to a first service provider via a network, the first request requesting first services from the first service provider;
intercepting, at a local agent, first traffic between the first application and an identity provider, the local agent acting as a proxy identity provider and having an internet protocol (IP) address of that of a subdomain of the domain of the identity provider;
performing an authentication process as to the identity provider;
receiving an identity provider cookie from the identity provider based on a validation of credentials during the authentication process;
storing, with the local agent, a copy of the identity provider cookie;
transmitting, on behalf of a second application executed on the client device, a second request to a second service provider via the network, the second request requesting second services from the second service provider;
intercepting, at the local agent, second traffic between the second application and the identity provider; adding the identity provider cookie to the second traffic; and
receiving validation to access the second service provider from the identity provider based on the identity provider cookie stored by the local agent, wherein transmitting the first request to the first service provider and intercepting, at the local agent, the first traffic between the first application and the identity provider includes:
defining, with the local agent and at the client device, a routing definition to cause the first traffic and the second traffic directed to the identity provider to be intercepted by the local agent;
intercepting, by the local agent, a first redirect message from the first service provider via the first application, the first redirect message including a uniform resource locator (URL) of the identity provider, the URL of the identity provider including a domain name of the identity provider;
determining if the identity provider cookie is stored by the local agent; and
based at least in part on the local agent not storing the identity provider cookie and the routing definition, transmitting the first redirect message to the identity provider.

15. The client device of claim 14,
the operations further comprising:
based at least in part on the validation of the credentials during the authentication process, receiving a second redirect message from the identity provider, the second redirect message including the identity provider cookie;
transmitting the second redirect message to the first application, the first application installing the identity provider cookie;
transmitting the second redirect message to the first service provider; and
based at least in part on the first service provider validating the identity provider cookie:
receiving a service provider cookie from the service provider at the first application; and
receiving the first services from the first service provider at the first application based at least in part on the validation of the service provider cookie;
receiving a third redirect message from the second service provider via the second application, the third redirect message being modified by the second application;
determining if the identity provider cookie is stored by the local agent;
based at least in part on the local agent storing the identity provider cookie:
performing a name resolution process, the name resolution process returning the URL of the identity provider;
adding the identity provider cookie stored by the local agent to the first redirect message; and
transmitting the second redirect message to the identity provider;
the operations further comprising:
receiving a fourth redirect message from the identity provider, the fourth redirect message validating the identity provider cookie;

transmitting the fourth redirect message to the second application, the second application installing the identity provider cookie; and
transmitting the fourth redirect message to the second service provider; and
based at least in part on the second service provider validating the identity provider cookie:
receiving the service provider cookie from the service provider at the first application; and
receiving the second services from the second service provider at the second application based at least in part on the validation of the service provider cookie.

16. The client device of claim 15, wherein transmitting the first request to the first service provider and intercepting, at the local agent, the first traffic between the first application and the identity provider includes:
defining, at the client device, the routing definition including interception of the first traffic and the second traffic to the identity provider by the local agent;
receiving the first redirect message from the identity provider via the first service provider via and the first application;
determining if the identity provider cookie is stored by the local agent;
based at least in part on the local agent not storing the identity provider cookie, transmitting the first redirect message to the identity provider;
the operations further comprising:
determining if the first application is local to the client device;
based at least in part on the validation of the credentials during the authentication process, receiving the second redirect message from the identity provider via the first application, the second redirect message including the identity provider cookie;
storing, with the local agent, the copy of the identity provider cookie; and
transmitting the third redirect message to the first service provider;
receiving the second redirect message from the second service provider via the second application and the identity provider;
determining if the identity provider cookie is stored by the local agent;
based at least in part on the local agent storing the identity provider cookie, transmitting the fourth redirect message to the identity provider for validation via the second application, the fourth redirect message including instructions to install the identity provider cookie on the second application;
transmitting the fourth redirect message to the second service provider;
determining if the second application is local to the client device;
based at least in part on the second service provider validating the identity provider cookie:
receiving a service provider cookie from the service provider at the second application; and
receiving the second services from the second service provider at the second application based at least in part on the validation of the service provider cookie.

17. The client device of claim 14, wherein:
the identity provider is a single sign-on (SSO) server; and
the local agent is a subdomain of the identity provider.

18. The client device of claim 14, wherein the first application and the second application are of different types of applications executed via different computer-executable code.

19. A method of performing a single sign-on, comprising:
transmitting, on behalf of a first application executed on a client device, a first request to a first service provider via a network, the first request requesting first services from the first service provider;
intercepting, at a local agent, first traffic between the first application and an identity provider, the local agent acting as a proxy identity provider and having an internet protocol (IP) address of that of a subdomain of the domain of the identity provider;
performing an authentication process as to the identity provider;
receiving an identity provider cookie from the identity provider based on a validation of credentials during the authentication process;
storing, with the local agent, a copy of the identity provider cookie; transmitting, on behalf of a second application executed on the client device, a second request to a second service provider via the network, the second request requesting second services from the second service provider;
intercepting, at the local agent, second traffic between the second application and the identity provider;
adding the identity provider cookie to the second traffic; and
receiving validation to access the second service provider from the identity provider based on the identity provider cookie stored by the local agent, wherein transmitting the first request to the first service provider and intercepting, at the local agent, the first traffic between the first application and the identity provider includes:
defining, with the local agent and at the client device, a routing definition to cause the first traffic and the second traffic directed to the identity provider to be intercepted by the local agent;
intercepting, by the local agent, a first redirect message from the first service provider via the first application, the first redirect message including a uniform resource locator (URL) of the identity provider, the URL of the identity provider including a domain name of the identity provider; and
determining if the identity provider cookie is stored by the local agent.

20. The method of claim 19, wherein the first application and the second application install the identity provider cookie.

* * * * *